US012812758B2

(12) United States Patent
Barrows et al.

(10) Patent No.: US 12,812,758 B2
(45) Date of Patent: Nov. 24, 2026

(54) REDUCED FORM FACTOR PLASMA WINDOWS POSITIONED IN A BEAM ACCELERATOR SYSTEM

(71) Applicant: SHINE Technologies, LLC, Janesville, WI (US)

(72) Inventors: Preston Barrows, Madison, WI (US); Joshua Blatz, Monona, WI (US)

(73) Assignee: SHINE Technologies, LLC, Janesville, WI (US)

( * ) Notice: Subject to any disclaimer, the term of this patent is extended or adjusted under 35 U.S.C. 154(b) by 0 days.

(21) Appl. No.: 18/951,959

(22) Filed: Nov. 19, 2024

(65) Prior Publication Data

US 2025/0168962 A1 May 22, 2025

Related U.S. Application Data

(60) Provisional application No. 63/601,006, filed on Nov. 20, 2023.

(51) Int. Cl.
*H05H 1/46* (2006.01)

(52) U.S. Cl.
CPC ......... *H05H 1/466* (2021.05); *H05H 2242/10* (2013.01)

(58) Field of Classification Search
CPC .. H05H 1/466; H05H 2242/10; H05H 1/3452; H05H 1/48; H05H 2006/002; H05H 2277/13; H05H 3/06; G21B 3/006
See application file for complete search history.

(56) References Cited

U.S. PATENT DOCUMENTS 5,519,738 A 5/1996 Hirose
5,578,831 A 11/1996 Hershcovitch
5,917,874 A 6/1999 Schlyer et al.
(Continued)

FOREIGN PATENT DOCUMENTS

CN 107078020 A * 8/2017 ............. H01J 49/20
CN 110708857 A 1/2020
(Continued)

OTHER PUBLICATIONS

"A Plasma-Window Enhanced Accelerator-Based Deuterium-Tritium Neutron Generator System"—J.M. Blatz, P. Barrows, T. Gribb, D. M. Cech, G. Becerra, T. Kile, C. M.Jacobson, L.Jacobson, J. Giffey & R. Radel, Fusion Science and Technology, Published online: Mar. 10, 2023. (Year: 2023).*
(Continued)

*Primary Examiner* — Abdullah A Riyami
*Assistant Examiner* — Syed M Kaiser
(74) *Attorney, Agent, or Firm* — Dinsmore & Shohl LLP

(57) ABSTRACT

A beam accelerator system comprises: a beamline comprising a low-pressure chamber and an ion accelerator configured to generate an ion beam; a target chamber; and a plasma window assembly interposed between and fluidly connecting the beamline and the target chamber. The plasma window assembly comprises an anode and a plurality of cooling plates. Each cooling plate comprises an aperture having an aperture axis that is aligned with an aperture axis of an aperture in one or more adjacent cooling plates to form a plasma channel. One or more cooling plates of the plurality of cooling plates is a cathode plate comprising at least one cathode.

13 Claims, 12 Drawing Sheets

(56) References Cited

U.S. PATENT DOCUMENTS

| | | | | |
|---|---|---|---|---|
| 6,528,948 | B1 | 3/2003 | Hershcovitch et al. | |
| 6,724,003 | B1 | 4/2004 | Doi et al. | |
| 7,703,413 | B2 * | 4/2010 | Miebach | H05H 1/34 156/345.43 |
| 9,734,926 | B2 | 8/2017 | Piefer | |
| 11,037,765 | B2 | 6/2021 | Lane | |
| 11,315,700 | B2 | 4/2022 | Strangis | |
| 11,410,786 | B2 | 8/2022 | Murakami et al. | |
| 11,896,041 | B2 | 2/2024 | Currie | |
| 12,014,838 | B2 | 6/2024 | Rotsch et al. | |
| 2003/0049468 | A1 | 3/2003 | Hu et al. | |
| 2004/0100214 | A1 | 5/2004 | Erdman | |
| 2005/0084055 | A1 * | 4/2005 | Alvord | G21G 1/10 376/194 |
| 2005/0284374 | A1 | 12/2005 | Miebach et al. | |
| 2009/0090875 | A1 | 4/2009 | Gelbart et al. | |
| 2010/0201240 | A1 * | 8/2010 | Heinke | H05G 2/00 313/363.1 |
| 2017/0251547 | A1 | 8/2017 | Ito | |
| 2017/0301410 | A1 | 10/2017 | Stubbers et al. | |
| 2017/0330739 | A1 | 11/2017 | Hosaka | |
| 2018/0190471 | A1 | 7/2018 | Budge | |
| 2018/0206323 | A1 | 7/2018 | Kobernik et al. | |
| 2019/0259505 | A1 | 8/2019 | Murakami et al. | |
| 2021/0158987 | A1 | 5/2021 | Johnson et al. | |
| 2022/0270775 | A1 | 8/2022 | Piefer | |
| 2022/0359492 | A1 | 11/2022 | Liu | |
| 2022/0377872 | A1 * | 11/2022 | Gelbart | H05H 6/00 |
| 2024/0107653 | A1 * | 3/2024 | Gribb | H05H 6/00 |
| 2024/0297017 | A1 | 9/2024 | Barrows et al. | |
| 2024/0381520 | A1 | 11/2024 | Gribb et al. | |

FOREIGN PATENT DOCUMENTS

| | | | | |
|---|---|---|---|---|
| JP | 2022509361 | A * | 1/2022 | H05H 3/06 |
| WO | 2013116787 | A1 | 8/2013 | |
| WO | 2024081327 | A1 | 4/2024 | |
| WO | 2024233630 | A1 | 11/2024 | |

OTHER PUBLICATIONS

De Beer et al. "Performance of a Plasma Window for a High Pressure Differentially Pumped Deuterium Gas Target for Mono-Energetic Fast Neutron Production—Preliminary Results" Nuclear Instruments and Methods in Physics Research B 170 (2000) 259-265.

International Search Report and Written Opinion dated May 15, 2025, pertaining to Int'l Patent Application No. PCT/US2024/056464, 18 pgs.

Blatz et al. "A Plasma-Window Enhanced Accelerator-Based Deuterium-Tritium Neutron Generator System", Fusion Science and Technology, 2023 American Nuclear Society, DOI: https://doi.org/10.1080/15361055.2023.2167458, 14 pgs.

Hershcovitch "A Plasma Window for Vacuum—Atmosphere Interface and Focusing Lens of Sources for Non-Vacuum Ion Material Modification", AGS Department, Brookhaven National Laboratory, BNL-64733, 23 pgs.

Kroesen, et al., "Description of a Flowing Cascade Arc Plasma," Plasma Chemistry and Plasma Processing, vol. 10, No. 4, 1990.

Vijvers, W. A. J. (2011). A high-flux cascaded arc hydrogen plasma source. Technische Universiteit Eindhoven. https://doi.org/10.6100/IR710985.

Ikoma et al., "Demonstration of Plasma Window with 20 mm Diameter and Pressure Separation for Accelerator Applications," Plasma and Fusion Research, 2019, vol. 14, pp. 1206148.

Krasik et al., "Plasma window characterization," Journal of Applied Physics 101, 053305 (2007).

Huang et al., "Quantitative characterization of arc discharge as vacuum interface," Physics of Plasmas 21, 123511 (2014); doi: 10-1063/1.4903462.

* cited by examiner

REDUCED FORM FACTOR PLASMA WINDOWS POSITIONED IN A BEAM ACCELERATOR SYSTEM

CROSS-REFERENCE TO RELATED APPLICATION

This application claims the benefit of and priority to U.S. Provisional Patent Application No. 63/601,006, entitled "Reduced Form Factor Plasma Windows Positioned in a Beam Accelerator System," filed Nov. 20, 2023, the details of which are incorporated by reference.

STATEMENT REGARDING FEDERALLY SPONSORED RESEARCH AND DEVELOPMENT

The present disclosure was developed with Government support under Contract No. DE-AR0001377 awarded by the United States Department of Energy. The Government has certain rights in the present disclosure.

FIELD

The present disclosure generally relates to plasma window systems, particularly plasma window systems used in a beam accelerator system, such as, for example, a gaseous target neutron generation system.

TECHNICAL BACKGROUND

Beam accelerator systems may be used to generate neutrons via fusion for a variety of purposes, such as medical-grade radioactive isotope production, nuclear waste transmutation, fusion energy generation, and for use as a fusion-prototypic neutron source (FPNS). Generally speaking, beam accelerator systems include an ion accelerator that generates a high-energy ion beam that is directed to a target chamber. For instance, in gaseous target neutron generation systems, a high-energy ion beam is directed to a gaseous target.

SUMMARY

According to one embodiment, a beam accelerator system comprises a beamline comprising a low-pressure chamber and an ion accelerator configured to generate an ion beam; a target chamber; and a plasma window assembly interposed between and fluidly connecting the beamline and the target chamber. The plasma window assembly comprises an anode and a plurality of cooling plates, each cooling plate comprising an aperture having an aperture axis that is aligned with an aperture axis of an aperture in one or more adjacent cooling plates to form a plasma channel, wherein one or more cooling plates of the plurality of cooling plates is a cathode plate comprising at least one cathode.

According to another embodiment, a beam accelerator system comprises a plurality of beamlines each comprising a low-pressure chamber and an ion accelerator configured to generate an ion beam; a target chamber coupled to each of the plurality of beamlines such that the plurality of beamlines direct the ion beams into the target chamber; and a plurality of plasma window assemblies, each plasma window assembly interposed between and fluidly connecting a respective beamline of the plurality of beamlines and the target chamber. Each plasma window assembly comprises an anode and a plurality of cooling plates, each cooling plate comprising an aperture having an aperture axis that is aligned with an aperture axis of an aperture in one or more adjacent cooling plates to form a plasma channel, wherein one or more cooling plates of the plurality of cooling plates is a cathode plate comprising at least one cathode.

According to another embodiment, a method comprises generating a plasma in a plasma channel of a plasma window assembly interposed between and fluidly connecting a beamline and a target chamber, wherein the beamline comprises a low pressure chamber and an ion accelerator that generates an ion beam; and directing the ion beam through the plasma and into the target chamber. The plasma window assembly comprises an anode and a plurality of cooling plates, each cooling plate comprising an aperture having an aperture axis that is aligned with an aperture axis of an aperture in one or more adjacent cooling plates to form the plasma channel. One or more cooling plates of the plurality of cooling plates is a cathode plate comprising at least one cathode.

Additional features and advantages of the systems and methods disclosed herein will be set forth in the detailed description that follows, and in part will be readily apparent to those skilled in the art from that description or recognized by practicing the embodiments described herein, including the detailed description that follows, the claims, as well as the appended drawings.

It is to be understood that both the foregoing general description and the following detailed description describe various embodiments and are intended to provide an overview or framework for understanding the nature and character of the claimed subject matter. The accompanying drawings are included to provide a further understanding of the various embodiments, and are incorporated into and constitute a part of this specification. The drawings illustrate the various embodiments described herein, and together with the description serve to explain the principles and operations of the claimed subject matter.

DETAILED DESCRIPTION

Figure 1:
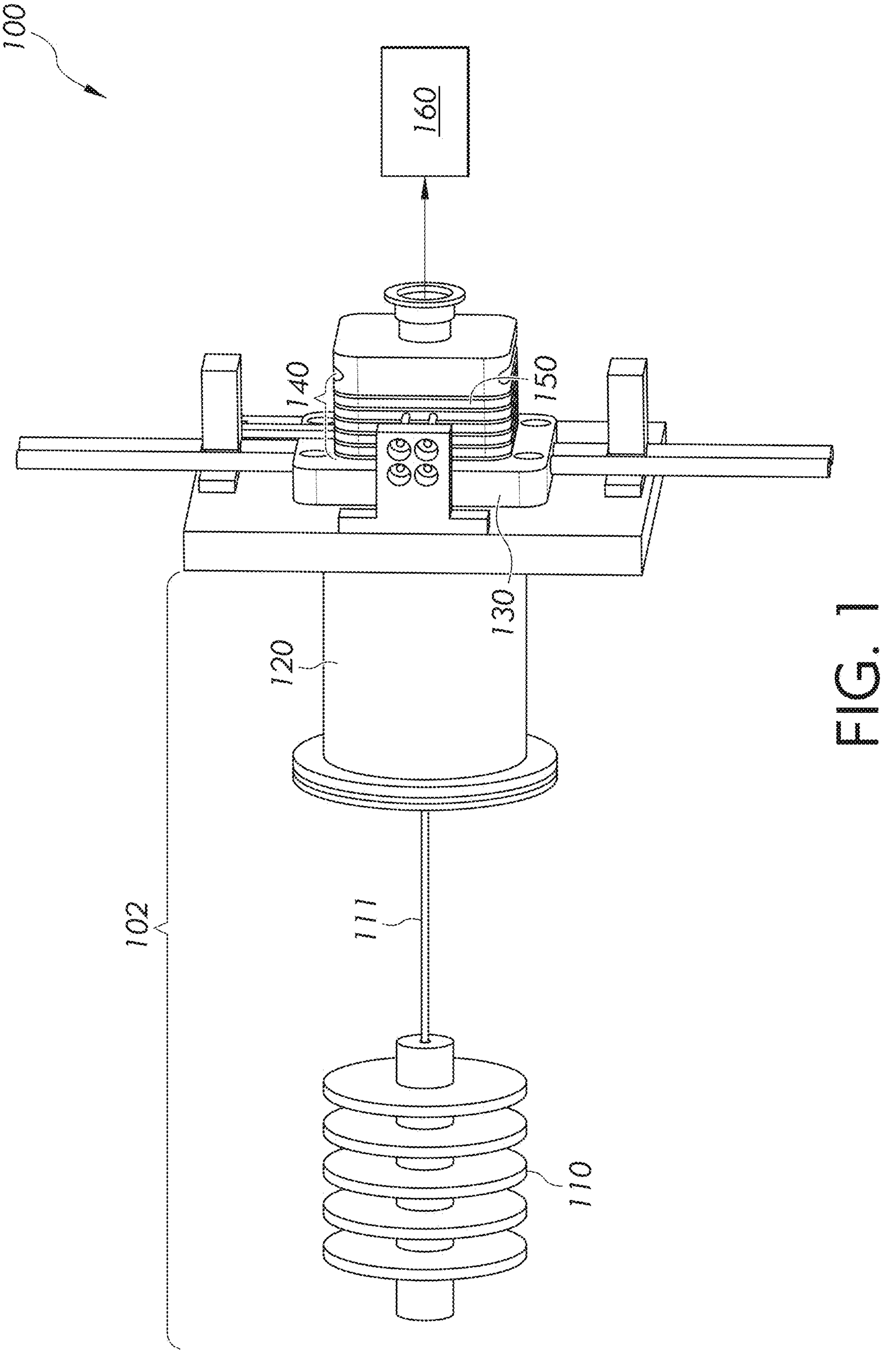
FIG. 1 schematically depicts a beam accelerator system, according to embodiments disclosed and described herein.

Reference will now be made in detail to embodiments of beam accelerator systems that include plasma windows, embodiments of which are illustrated in the accompanying drawings. Whenever possible, the same reference numerals will be used throughout the drawings to refer to the same or like parts.

Unless otherwise expressly stated, it is in no way intended that any method set forth herein be construed as requiring that its steps be performed in a specific order, nor that specific orientations be required with any apparatus. Accordingly, where a method claim does not actually recite an order to be followed by its steps, or that any apparatus claim does not actually recite an order or orientation to individual components, or it is not otherwise specifically stated in the claims or description that the steps are to be limited to a specific order, or that a specific order or orientation to components of an apparatus is not recited, it is in no way intended that an order or orientation be inferred, in any respect. This holds for any possible non-express basis for interpretation, including: matters of logic with respect to arrangement of steps, operational flow, order of components, or orientation of components; plain meaning derived from grammatical organization or punctuation, and; the number or type of embodiments described in the specification.

Directional terms as used herein—for example up, down, right, left, front, back, top, bottom—are made only with reference to the figures as drawn and the coordinate axis provided therewith and are not intended to imply absolute orientation.

References herein to the positions of elements (e.g., "top," "bottom," "above," "below") are merely used to describe the orientation of various elements in the figures. It should be noted that the orientation of various elements may differ according to other exemplary embodiments, and that such variations are intended to be encompassed by the present disclosure.

As used herein, the singular forms "a," "an," and "the" include plural referents unless the context clearly dictates otherwise. Thus, for example, reference to "a" component includes aspects having two or more such components, unless the context clearly indicates otherwise.

As utilized herein, the terms "approximately," "about," "substantially," and similar terms are intended to have a broad meaning in harmony with the common and accepted usage by those of ordinary skill in the art to which the subject matter of this disclosure pertains. Indeed, such terms refer to the subsequently listed property or measurement within normal manufacturing tolerances and imperfections in the relevant field. It should be understood by those of skill in the art that these terms are intended to allow a description of certain features described and claimed without restricting the scope of these features to the precise numerical values or idealized geometric forms provided. Accordingly, these terms should be interpreted as indicating that insubstantial or inconsequential modifications or alterations of the subject matter described and claimed are considered to be within the scope of the disclosure as recited in the appended claims.

The term "coupled" and variations thereof, as used herein, means the joining of two members directly or indirectly to one another. Such joining may be stationary (e.g., permanent or fixed) or moveable (e.g., removable or releasable). Such joining may be achieved with the two members coupled directly to each other, with the two members coupled to each other using a separate intervening member and any additional intermediate members coupled with one another, or with the two members coupled to each other using an intervening member that is integrally formed as a single unitary body with one of the two members. If "coupled" or variations thereof are modified by an additional term (e.g., directly coupled), the generic definition of "coupled" provided above is modified by the plain language meaning of the additional term (e.g., "directly coupled" means the joining of two members without any separate intervening member), resulting in a narrower definition than the generic definition of "coupled" provided above. Such coupling may be mechanical, electrical, or fluidic.

As used herein, "sample volume" refers to the volume of space available to place samples to be irradiated. The sample volume may be a space located outside of the target chamber. In some embodiments, the sample volume is a single, continuous volume and in other embodiments, the sample volume is comprised of multiple, separate volumes that collectively add up to the total sample volume size.

With reference now to FIG. 1, an embodiment of a beam accelerator system 100 is schematically depicted. The beam accelerator system 100 includes a beamline 102 comprising a low-pressure chamber 120 and an ion accelerator 110 configured to generate an ion beam 111 that is directed to the low-pressure chamber 120 (e.g., a beam accelerator region). In embodiments, the low-pressure chamber 120 is operated under vacuum conditions. The beam accelerator system 100 also comprises a target chamber 160 for housing a target gas, such as deuterium, tritium, helium, or argon. It should be understood that the beam accelerator system 100 depicted in FIG. 1 is merely schematic and is not to scale.

The beam accelerator systems 100 may be operative to produce neutrons via fusion reaction. These neutrons may be used, for example, to perform neutron radiography, to generate medical isotopes, to perform transmutation of radioisotopes, such as waste radioisotopes generated during the operation of a nuclear fission power plant, and to generate fusion power.

In some embodiments, the beam accelerator system 100 operates by first extracting a beam of deuterium from the ion accelerator 110, which may comprise an electron cyclotron resonance (ECR) based ion source. The deuterium beam is accelerated via stepped electrostatic potentials such that a desired deuterium-tritium fusion cross-section is achieved when the deuterium beam enters the gaseous tritium target, located in the target chamber 160, generating neutrons via a fusion reaction. In some embodiments, the deuterium beam is focused through a gas-flow-restricting aperture that separates the beam acceleration region (e.g., the low-pressure chamber 120) from the target chamber 160.

One key to generating neutrons over a small enough area to be useful is the ability to generate and maintain a large pressure gradient from the beam acceleration region (e.g., the low-pressure chamber 120) to the gaseous target chamber 160, which may be filled with tritium, particularly when generating neutrons for neutron radiography, medical isotope production, radioisotope transmutation, and fusion power generation. The beam acceleration region (e.g., the low-pressure chamber 120) operates under high vacuum conditions. In contrast, the gas target chamber 160, where neutrons may be generated, may operate at pressures over multiple powers of ten higher, for example, over a million times higher, to stop the ion beam over a short distance, e.g., approximately one meter. Current beam accelerator systems accomplish this pressure differential through a series of differentially pumped stages in which each stage is separated by a gas-flow-restricting aperture that will allow the ion beam to pass but restricts gas flow from higher to lower-pressure regions. The exhaust from each pumping stage is returned to the adjacent, higher-pressure stage.

Traditionally, such differentially pumped stages require large and expensive pumping infrastructure to maintain the low pressure required for the ions to be accelerated from the ion accelerator 110 while maximizing the pressure in the target chamber 160. Larger ion beam sizes and higher current ion beams require more pumping due to the conductance of the ion beam through a channel and into the target chamber 160. Therefore, the beam size and thus total yield of a system is limited by the diameter of the channel leading to the target chamber 160. Moreover, if the aperture were widened to allow more beam to pass, the gas flow from the high-pressure region to the low-pressure region would necessarily increase. This increase in gas flow would then reduce the pressure differential across the adjacent stages. Alternatively, if the diameter of the aperture were reduced, an increased pressure differential would be seen, though this reduction of aperture diameter would also require a reduction in beam current to make it possible to focus said beam through the now smaller cross-sectional area of the aperture.

Figure 2:
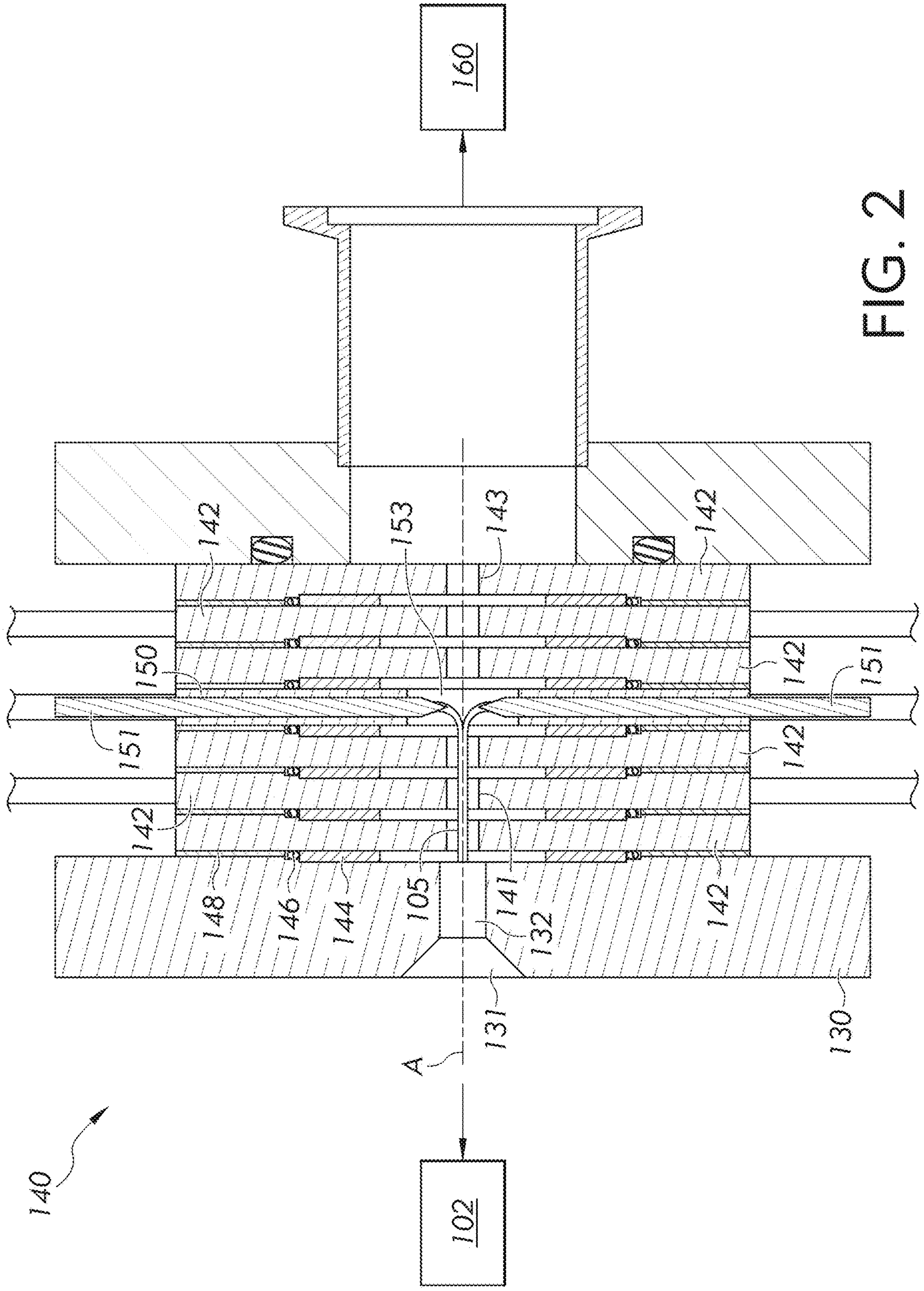
FIG. 2 schematically depicts a cross-section of a plasma window assembly, according to embodiments disclosed and described herein.

With reference to FIGS. 1 and 2, the beam accelerator systems 100 disclosed herein include a plasma window assembly 140 interposed between and fluidly connecting the beamline 102 and the target chamber 160. The plasma window assembly 140 may comprise an anode 130 and a plurality of cooling plates 142, each cooling plate 142 comprising an aperture 143 having an aperture axis A that is aligned with an aperture axis A of an aperture 143 in one or more adjacent cooling plates 142 to form a plasma channel 141. One or more cooling plates 142 of the plurality of cooling plates 142 is a cathode plate 150 comprising at least one cathode 151.

The plasma window 140 operates as a vacuum barrier to separate the low-pressure beam acceleration region (i.e., the low-pressure chamber 120 of the beamline 102) and the target chamber 160. The plasma window 140 allows for a greater pressure reduction factor relative to traditional channels, which allows the plasma channel 141, through which the ion beam 111 travels to reach the target chamber 160, to be widened. The widening of the plasma channel 141 enables larger and higher current ion beams 111 to pass into the target chamber 160, thereby enabling increased neutron generation and flux. Moreover, the gains from pressure reduction also reduce the total pumping cost due to the decrease in conductance and pumping hardware required to maintain the pressure differential. This change alone enables a significant reduction in length of the target chamber 160 and thus, a significant increase in neutron flux.

With reference to FIG. 2, the anode 130 is, in embodiments, a grounded plate that comprises a nozzle 131 that is fluidly connected to the low-pressure chamber 120 of the beamline 102. The nozzle 131 is also fluidly connected to an anode channel 132 positioned in the anode 130. The nozzle 131 and the anode channel 132 in the anode 130 allow the ion beam 111 to pass from the low-pressure side of the beam accelerator system 100 to the high-pressure target chamber 160. To this end, in one or more embodiments, the anode 130 and/or the low-pressure chamber 120 are mounted to and fluidly connected to a pumping system.

As mentioned above, one or more cooling plates of the plurality of cooling plates 142 is a cathode plate 150 containing at least one cathode 151. In embodiments, the cathode plate 150 is positioned near the center of the plurality of cooling plates 142. In other embodiments, the cathode plate 150 may be positioned closer to one end of the plurality of cooling plates 142, which may result in the cathodes thereof functioning similarly to those of a traditional configuration. The aperture 143 of the cathode plate 150, herein referred to as the cathode plate aperture 153, may be fluidly coupled to the target chamber 160 and thereby contain some of the target gas housed in the target chamber 160. The target chamber 160 and the cathode plate aperture 153 may be pressurized by a pumping system, a gas bottle, or the like. Each cathode of the at least one cathode 151 may extend from the cathode plate 150 into the cathode plate aperture 153 and may apply a voltage (e.g., a voltage in a range of from 150 V to 5000 V) in the cathode plate aperture 153 to initiate and/or maintain the heating and ionization of a portion of the target gas, thereby forming a plasma 105, which may be a viscous plasma. The plasma 105 may comprise a wall-stabilized DC vacuum arc plasma formed within the plasma channel 141. Without intending to be limited by theory, the vacuum arc originates from the cathodes 151, which may comprise materials with low work function known to those skilled in the art, e.g., pure tungsten, thoriated tungsten, lanthanated tungsten, ceriated tungsten, zirconiated tungsten, lanthanum hexaboride, etc. The integration of a small amount of alloying elements such as thorium into tungsten allows it to maintain the refractory material properties of tungsten while reducing the work function of the material to generate much stronger thermionic emission than pure tungsten, thereby increasing the lifetime and thermal efficiency of the cathodes 151. In other words, the material used for the cathodes 151 affects the lifetime and the maximum discharge current of the cathodes 151.

While the cathodes 151, in some embodiments, may apply a voltage to both initiate and maintain the formation of the plasma 105, other methods of initiating formation of the plasma 105 are contemplated, such as using one or more initiation coils, such as tesla coils, to apply the initial voltage. Such initiation coils, while not depicted, may be mounted on one or more of the cooling plates 142 of the plasma window assembly 140. Attaching the initiation coils to the cooling plate closest to the cathode cooling plate 150 will generate ions and electrons within the vacuum system, initiating the arc discharge from the cathodes 151 to the anode 130, thereby forming the plasma 105. However, in embodiments, the initiation coils are attached at other locations, e.g., at one or more cooling plates spaced apart from the cathode cooling plate by at least one cooling plate.

Moreover, in embodiments comprising initiation coils, the cathodes 151 may still apply a voltage to maintain the plasma 105.

As mentioned above, each cooling plate 142 comprises an aperture 143 having an aperture axis A that is aligned with an aperture axis A of an aperture 143 in one or more adjacent cooling plates 142 to form the plasma channel 141. In embodiments, the aperture 143 of each cooling plate 142 is circular and at or near the geometrical center of the cooling plate 142. However, the position of the aperture 143 in each cooling plate need not be centered provided sufficient cooling is maintained. When the plurality of plates 142 are aligned and connected, the coaxial apertures 143 in the cooling plates 142 form the plasma channel 141 through which the high-energy ion beam 111 will travel from the beamline 102 to the target chamber 160. It should be appreciated that in embodiments the apertures 143 in the cooling plates 142 need not be perfectly circular and may be any shape that can accommodate the transmission of the high-energy ion beam 111. Moreover, while the cooling plates 142 are depicted herein as generally square shaped, any suitable shape for the cooling plates 142 may be used. For example, in embodiments, the cooling plates 142 may be circular shaped, a hexagonal shaped, or octagonal shaped.

The cooling plates 142 of the plasma window assembly 140 are, in embodiments, electrically floating and cooled with a fluid, such as water, which will be discussed in more detail below. The cooling plates 142 may implement any suitable cooling channel design, such as those described in U.S. patent application Ser. No. 17/951,975 entitled "Cooling Plate Assembly for Plasma Windows Positioned in a Beam Accelerator System" or U.S. patent application Ser. No. 18/116,036, entitled "Jet Impingement Cooling Assembly For Plasma Windows Positioned In A Beam Accelerator System," each of which is incorporated herein by reference in its entirety.

In one or more embodiments, separators may be positioned between portions of adjacent plates 142. The separators may provide electrical insulation and maintain a vacuum seal between the plates while also being able to withstand high temperatures and particles of plasma discharge. In embodiments, the separators may comprise a central spacer 144, e.g., a boron nitride, aluminum nitride, or alumina spacer, most proximate to the plasma channel 141, an O-ring 146, e.g., a Viton O-ring, surrounding the central spacer 144, and an outer spacer 148, e.g., a PVC or PEEK spacer, surrounding the O-ring 146. In order to provide longer lifetimes in high neutron environments brazed or diffusion bonded metal-to-ceramic seals may also be used as alternatives to O-rings.

The beam accelerator systems 100 disclosed herein may be used in methods comprising generating the plasma 105 in the plasma channel 141 of the plasma window assembly 140 interposed between and fluidly connecting the beamline 102 and the target chamber 160, and directing the ion beam 111 from the ion accelerator through the plasma 105 and into the target chamber 160. Generating the plasma 105 in the plasma channel 141 may comprise applying an input voltage to a target gas in the plasma channel 141, thereby heating and ionizing a portion of the target gas to form the plasma 105. As previously discussed, the target chamber 160 may house a target gas and the ion beam 111 may interact with the target gas to produce neutrons via a fusion reaction. The methods disclosed herein may further comprise impinging a sample volume with neutrons generated via a fusion reaction.

Figure 3:
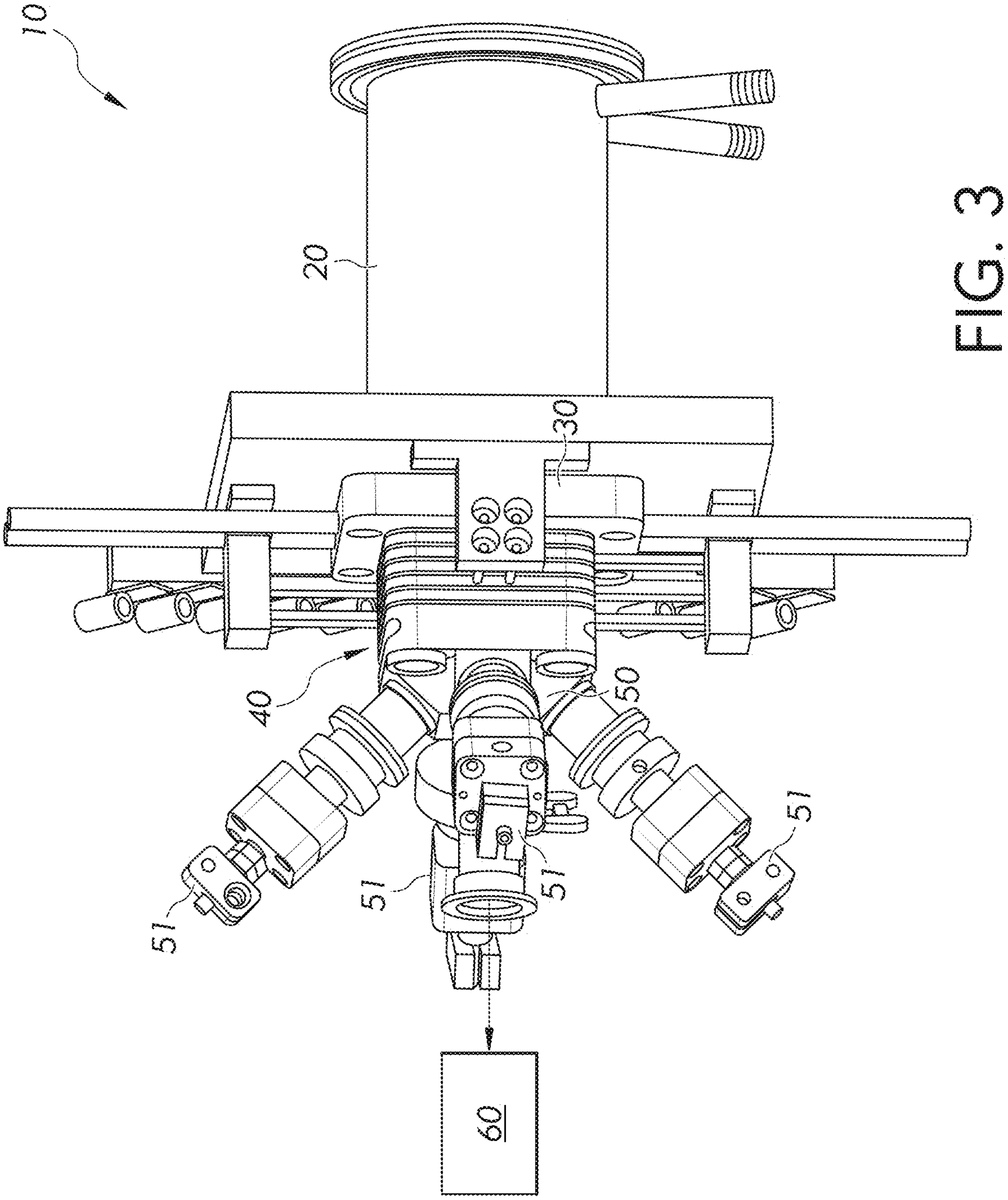
FIG. 3 schematically depicts a beam accelerator system having a conventional cathode arrangement.

FIG. 3 schematically depicts previously disclosed beam accelerator system 10. As shown in the beam accelerator system 10, existing beam accelerator systems typically have one or more cathodes 51 positioned adjacent to the target chamber 60 and a plasma window assembly 40. An anode 30 is adjacent and fluidly connected to the plasma window assembly 40 and the low-pressure chamber 20. FIG. 3 depicts a typical cathode arrangement wherein the cathodes 51 are bulky and angularly arranged and supported by a cathode housing 50, each cathode 51 having a cathode needle (not shown) extending into the cathode housing 50. As can be seen in FIG. 3, existing cathode arrangements occupy considerable volumes in beam accelerator systems. Moreover, existing cathode arrangements further suffer from electrode erosion as a result of poor cooling of the cathodes, leaks associated with sealing surfaces between cooling water and vacuum, and a limited number of cathodes due to space limitations resulting from the bulky nature of the cathodes 51 and cathode housing 50.

Therefore, a need exists for beam accelerator systems with plasma windows having reduced form factors that may also address the above-mentioned issues. The beam accelerator systems of the present disclosure include plasma window systems having reduced form factors wherein the size of the plasma window may be reduced in terms of the plasma window length, width, and height. In particular, the plasma window systems of the present disclosure offer improved cathode designs that are compatible with limited space requirements in the target area of beam accelerator systems, such as, for example, neutron generator systems. The cathode designs of the present disclosure involve embedding cathodes directly in one or more cooling plates of the plasma window system, i.e., so as to form the cathode plate discussed herein. By positioning the cathode plate such that it is central among the plurality of cooling plates, additional space may be made available near the target chamber, which may reduce design constraints that might otherwise be present. Moreover, the plasma window systems of the present disclosure provide several additional benefits, including: the avoidance of brazed joints exposed to vacuum or arc heating, self-biasing electron suppression, modular capabilities in that the position and number of cathode plates may be adjusted, simplified system fabrication, and improved ease of maintenance. These and other benefits will be readily apparent from the description and embodiments described herein.

An embodiment of the cathode plate 150 of the present disclosure will now be described in more detail with reference to FIGS. 4A and 4B, which show a front view of the cathode plate 150 and a side view of the cathode plate 150, respectively. For illustrative purposes, cooling channels 162 and 164 (discussed below) are not shown in FIG. 4B. As mentioned above, the cathode plate 150 comprises at least one cathode 151 and a cathode plate aperture 153. The cathode plate aperture 153 may be circular and positioned near the geometrical center of the cathode plate 150. However, it should be appreciated that, in embodiments, the cathode plate aperture 153 may not be perfectly circular and may be any shape that can accommodate the transmission of the ion beam 111. The majority of the cathode plate 150 may be constructed from a thermally conductive metal, such as copper, silver, molybdenum, tungsten, or related alloys. In embodiments, the cathode plate 150 is constructed from copper. Additionally, the plate can be a combination of materials. For example, as discussed in more detail below, the cathode plate 150 may consist of a largely copper body with a tungsten layer forming the inner wall of the cathode plate aperture 153, herein referred to as the cathode aperture wall 154.

Figure 4A:
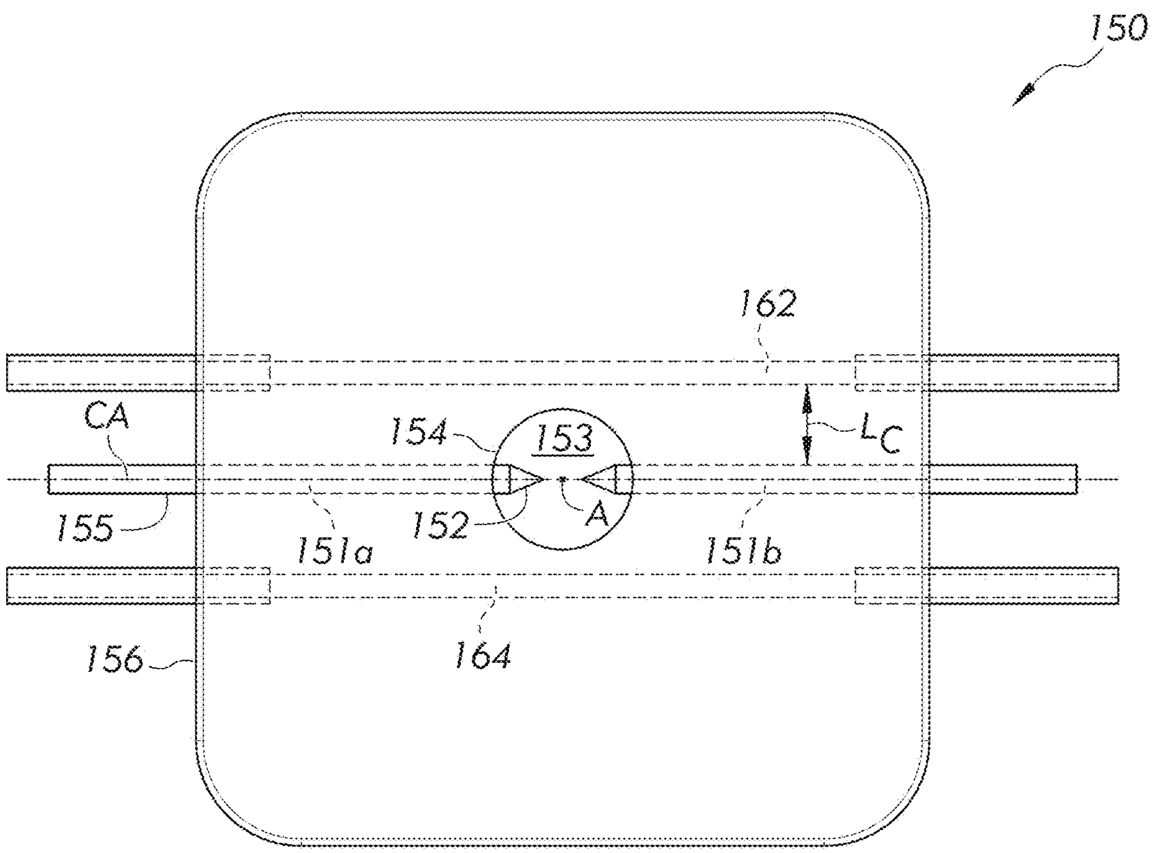
FIG. 4A schematically depicts a front view of a cathode plate of a plasma window assembly comprising electrically isolated cathodes, according to embodiments disclosed and described herein.
Figure 4B:
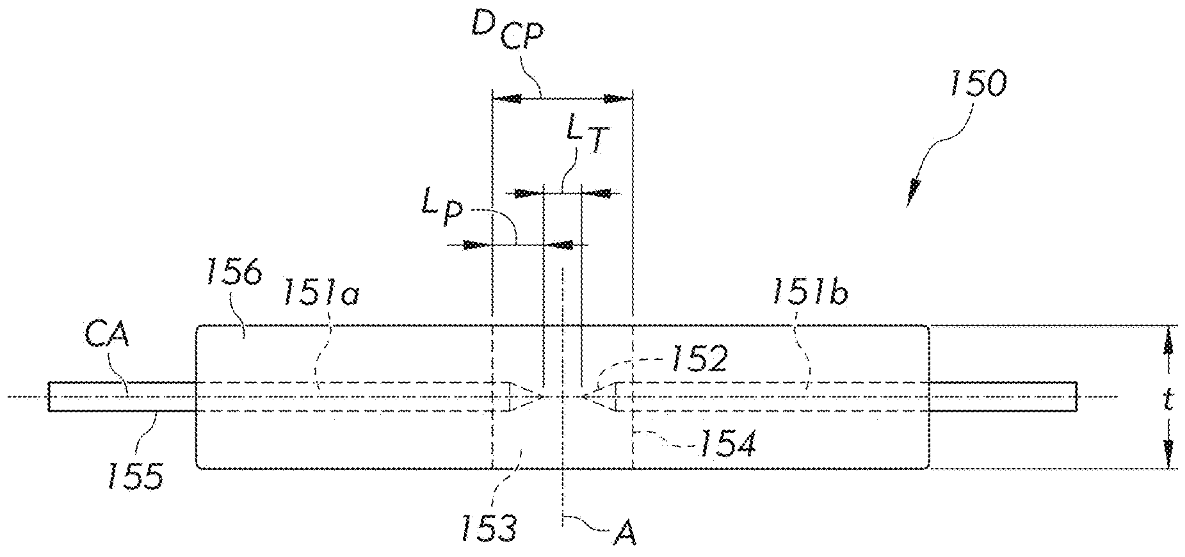
FIG. 4B schematically depicts a side view of the cathode plate shown in FIG. 4A.

In the embodiment shown in FIGS. 4A and 4B, the cathode plate 150 comprises a first cathode 151*a* and a second cathode 151*b*, the first cathode 151*a* positioned radially opposite the second cathode 151*b* with respect to the aperture axis A of the cathode plate 150. The first cathode 151*a* and the second cathode 151*b* may define a cathode axis CA. The cathode plate 150 may comprise one or more cooling channels extending through the thickness t of the cathode plate 150, as shown in FIG. 4B. The cathode plate 150 may comprise a first cooling channel 162 and a second cooling channel 164, each of which extend through the cathode plate 150 in a direction substantially parallel to the cathode axis CA. As used herein, "substantially parallel" is used to mean parallel with acceptable manufacturing tolerances. Cooling fluid, such as deionized water or the like, may be flushed through the cooling channels, thereby extracting heat from portions of the cooling plate 150 near the cathode aperture wall 154 and the cathodes 151*a* and 151*b*. The positioning of the cathodes 151 directly between cooling channels may promote efficient and effective cooling of the cathodes 151. The cathode plate 150 may be fabricated to avoid seams between the cooling channels and heated surfaces, i.e., the cathode aperture wall 154, thereby improving robustness by preventing coolant from entering into the vacuum system.

The direction in which the cooling fluid flows through each of the first cooing channel 162 and the second cooling channel 164 may be the same or opposite. In embodiments, the first and second cooling channels 162 and 164 may have a circular cross section with diameters sized according to the amount of cooling fluid throughput that is desired. In embodiments, the first and second cooling channels 162 and 164 may have a cross-section that is elliptical, square, rectangular, pentagonal, hexagonal, or octagonal. Of course, the cross-sectional dimensions, such as the diameter, of the first and second cooling channels 162 and 164 is limited by the thickness t of the cathode plate 150. The first and second cooling channels 162 and 164 may be spaced from the cathode axis CA by a separation distance $L_C$, the size of which may be dictated by the size of the cathode plate aperture 153. In embodiments, the first and second cooling channels 162 and 164 are placed as close as possible to the cathodes 151 and the cathode aperture wall 154 while maintaining a small buffer to maintain vacuum integrity in case of material erosion or melting. In embodiments, the separation distance $L_C$ is equal to at least 0.5 times the diameter of the cooling channels, at least 1.0 times the diameter of the cooling channels, at least 1.5 times the diameter of the cooling channels, or at least 2.0 times the diameter of the cooling channels.

In embodiments, the first and second cooling channels 162 and 164 may, upon approaching the cathode plate aperture 153, deviate around the cathode plate aperture 153 before becoming substantially parallel again with the cathode axis CA. For example, the first cooling channel 162 may, upon approaching the cathode plate aperture 153, turn in an upward direction relative to FIG. 4A, extend in an annular shape adjacent to the cathode plate aperture 153 around a portion of the cathode aperture wall 154, before turning to become substantially parallel again with the cathode axis CA. Similarly, the second cooling channel 164 may, upon approaching the cathode plate aperture 153, turn in an downward direction relative to FIG. 4A, extend in an annular shape adjacent to the cathode plate aperture 153 around a portion of the cathode aperture wall 154, before turning to become substantially parallel again with the cathode axis CA.

In embodiments, the cathode plate aperture 153 has a diameter $D_{CP}$ that is from 1.0 mm to 50.0 mm, such as from 1.0 mm to 40.0 mm, from 1.0 mm to 30.0 mm, from 1.0 mm to 25.0 mm, from 1.0 mm to 20.0 mm, from 1.0 mm to 15.0 mm, from 2.0 mm to 15.0 mm, from 5.0 mm to 50.0 mm, from 10.0 mm to 50.0 mm, from 10.0 mm to 45.0 mm, from 15.0 mm to 45.0 mm, from 15.0 mm to 40.0 mm, from 20.0 mm to 40.0 mm, from 20.0 mm to 35.0 mm, or from 25.0 mm to 35.0 mm. However, it should be understood that the diameter $D_{CP}$ is related to the maximum pressure differential that can be achieved with a given set of vacuum pumps as well as the power of the arc discharge. Accordingly, diameters $D_{CP}$ falling outside of the above ranges may be implemented for some applications of the beam accelerator system 100. Moreover, the diameter $D_{CP}$ of the cathode plate aperture 153 may be the same or different than the diameter $D_A$ of the aperture 143 of the cooling plates 142, as shown in FIG. 2. In embodiments, the diameter $D_A$ of the aperture 143 of the cooling plates 142 may be from 1.0 mm to 50.0 mm, such as from 1.0 mm to 40.0 mm, from 1.0 mm to 30.0 mm, from 1.0 mm to 25.0 mm, from 1.0 mm to 20.0 mm, from 1.0 mm to 15.0 mm, from 1.0 mm to 10.0 mm, from 2.0 mm to 15.0 mm, from 2.0 mm to 8.0 mm, from 3.0 mm to 7.0 mm, from 4.0 mm to 6.0 mm, from 5.0 mm to 50.0 mm, from 10.0 mm to 50.0 mm, from 10.0 mm to 45.0 mm, from 15.0 mm to 45.0 mm, from 15.0 mm to 40.0 mm, from 20.0 mm to 40.0 mm, from 20.0 mm to 35.0 mm, or from 25.0 mm to 35.0 mm. In embodiments, the diameter $D_{CP}$ of the cathode plate aperture 153 may be less than or equal to 10 times $D_A$, less than or equal to 5 times $D_A$, less than or equal to 4 times $D_A$, less than or equal to 3 times $D_A$, less than or equal to 2 times $D_A$, or less than or equal to 1.5 times $D_A$.

Each cathode 151 may comprise a cathode tip 152 that, in embodiments, protrudes radially inwards from the cathode aperture wall 154 of the cathode plate aperture 153 of the cathode plate 150. In embodiments, the cathodes 151 may be oriented such that the cathode axes CA are perpendicular to the beam axis A. In other embodiments, the cathodes 151 may be oriented such that the cathode axes CA form an angle with the beam axis A that is less or greater than 90 degrees.

In embodiments, the cathode tip 152 may protrude radially inwards from the cathode aperture wall to a protruding distance $L_P$ from the cathode aperture wall 154 of at least 1.0 mm, at least 2.0 mm, at least 3.0 mm, at least 4.0 mm, at least 5.0 mm, at least 6.0 mm, at least 7.0 mm, or at least 8.0 mm. In embodiments, the protruding distance $L_P$ of the cathode tip 152 may be greater than 8.0 mm. In embodiments, the protruding distance $L_P$ may be less than or equal to 8.0 mm, less than or equal to 7.00 mm, less than or equal to 6.00 mm, less than or equal to 5.00 mm, less than or equal to 4.00 mm, less than or equal to 3.00 mm, less than or equal to 2.00 mm, or less than or equal to 1.00 mm. In embodiments, the protruding distance $L_P$ of the cathode tip 152 may be between 0.01 times $D_{CP}$ and 0.5 times $D_{CP}$, between 0.01 times $D_{CP}$ and 0.45 times $D_{CP}$, between 0.05 times $D_{CP}$ and 0.45 times $D_{CP}$, between 0.05 times $D_{CP}$ and 0.40 times $D_{CP}$, between 0.10 times $D_{CP}$ and 0.40 times $D_{CP}$, between 0.10 times $D_{CP}$ and 0.35 times $D_{CP}$, between 0.15 times $D_{CP}$ and 0.35 times $D_{CP}$, between 0.15 times $D_{CP}$ and 0.30 times $D_{CP}$, or between 0.20 times $D_{CP}$ and 0.30 times $D_{CP}$. In embodiments, the protruding distance $L_P$ of the cathode tip 152 may be less than or equal to 0.25 times $D_{CP}$. In embodiments, the cathode tip 152 does not protrude from the cathode aperture wall 154.

In embodiments, the cathode tips 152 of the first cathode 151*a* and the second cathode 151*b* are spaced from each other in the cathode plate aperture 153 by a cathode tip spacing $L_T$ of between 0.01 times $D_{CP}$ and 0.95 times $D_{CP}$, between 0.05 times $D_{CP}$ and 0.95 times $D_{CP}$, between 0.05 times $D_{CP}$ and 0.90 times $D_{CP}$, between 0.10 times $D_{CP}$ and 0.90 times $D_{CP}$, between 0.10 times $D_{CP}$ and 0.80 times $D_{CP}$, between 0.10 times $D_{CP}$ and 0.70 times $D_{CP}$, between 0.10 times $D_{CP}$ and 0.60 times $D_{CP}$, between 0.10 times $D_{CP}$ and 0.50 times $D_{CP}$, between 0.15 times $D_{CP}$ and 0.50 times $D_{CP}$, between 0.15 times $D_{CP}$ and 0.45 times $D_{CP}$, between 0.20 times $D_{CP}$ and 0.45 times $D_{CP}$, between 0.20 times $D_{CP}$ and 0.40 times $D_{CP}$, between 0.25 times $D_{CP}$ and 0.40 times $D_{CP}$, between 0.25 times $D_{CP}$ and 0.35 times $D_{CP}$, or between 0.30 times $D_{CP}$ and 0.35 times $D_{CP}$. In embodiments, the cathode tip spacing $L_T$ is greater than or equal to 1.0 times $D_{CP}$. In embodiments wherein the cathode tips 152 extend to the beam axis A, the cathode tip spacing $L_T$ is zero.

In the embodiment shown in FIGS. 4A and 4B, the cathodes 151 embedded in the cathode plate 150 may be electrically isolated from the remainder of the cathode plate 150 and comprises portions 155 of the cathode 151 that extend through an edge 156 of the cathode plate 150, which extends around the perimeter of the cathode plate 150. In such embodiments, the cathodes 151 may be provided with an electrical current via the portions 155 extending through the edge 156 of the cathode plate 150. The cathodes 151 may be provided with an insulating sleeve (not shown) configured to electrically isolate the cathodes 151 from the remainder of the cathode plate 150.

Figure 5A:
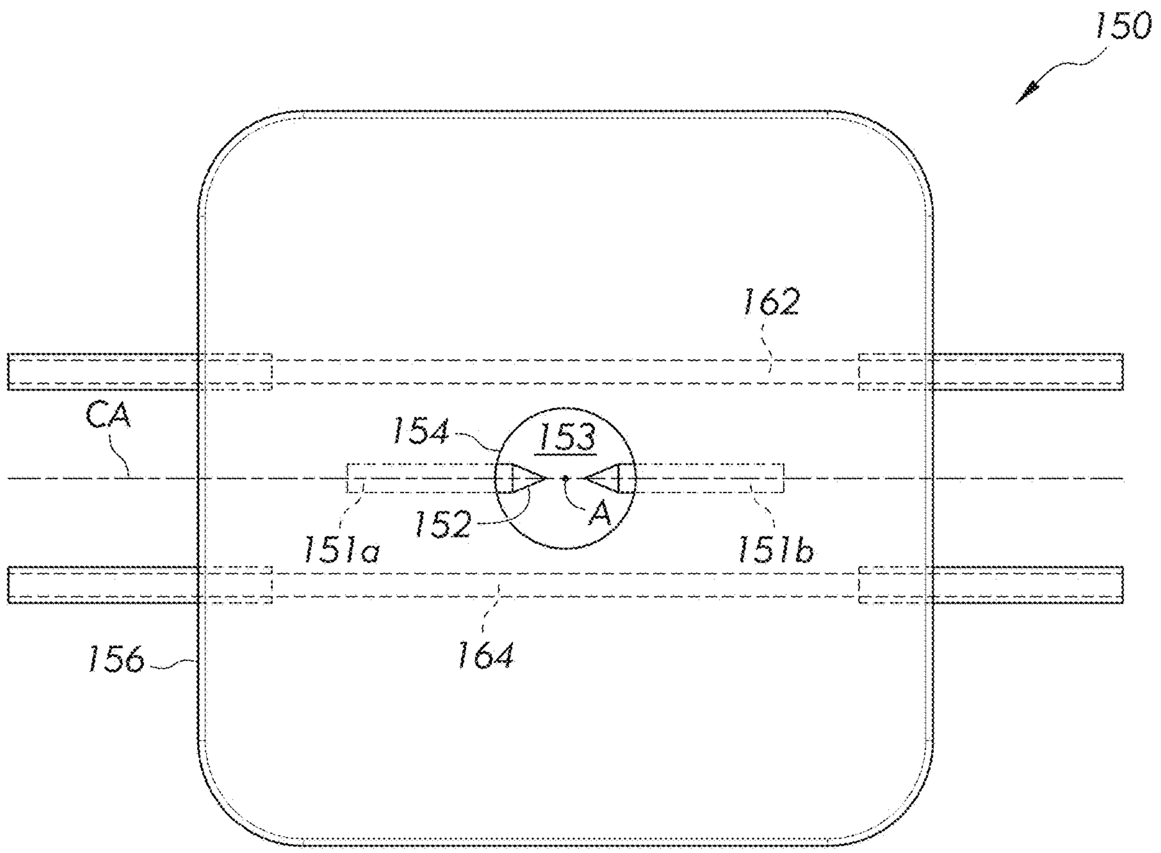
FIG. 5A schematically depicts a front view of a cathode plate of a plasma window assembly comprising cathodes that are not electrically isolated, according to embodiments disclosed and described herein.
Figure 5B:
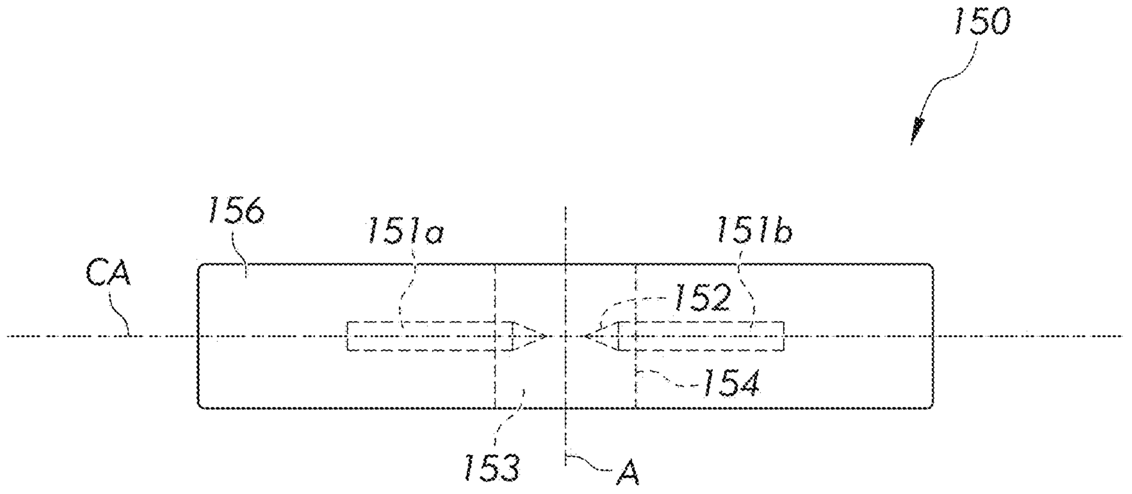
FIG. 5B schematically depicts a side view of the cathode plate shown in FIG. 5A.

With reference now to FIGS. 5A and 5B, in embodiments of the cathode plate 150, the cathodes 151 are not electrically isolated from the remainder of the cathode plate 150. For illustrative purposes, the cooling channels 162 and 164 shown in FIG. 5A are not shown in FIG. 5B. In such embodiments, the cathodes 151 may be embedded in the cathode plate 150 without a portion of the cathodes extending through the edge 156 of the cathode plate 150, as shown in FIGS. 5A and 5B. In such embodiments, the cathode plate 150 may be electrically connected to a power source (not shown) and the cathodes 151 may receive electrical current directly from the cathode plate 150.

In embodiments, the cathode plate 150 comprises a plurality of cathodes 151 radially arranged about the aperture axis A of the cathode plate 150. The radially spacing between cathodes 151 about the aperture axis A of the cathode plate 150 may be uniform or non-uniform.

Figure 6:
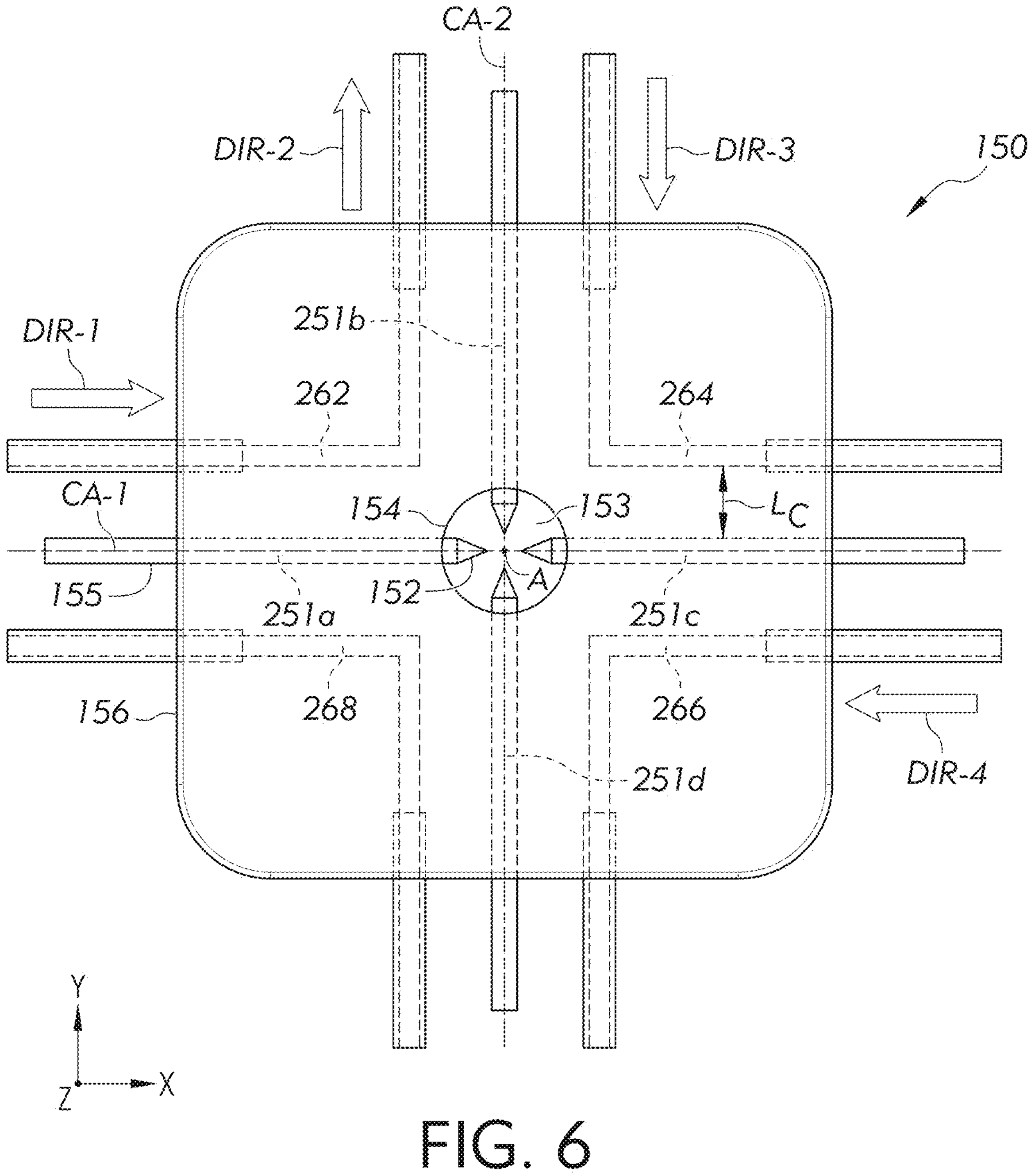
FIG. 6 schematically depicts a front view of cathode plate having four embedded cathodes, according to embodiments disclosed and described herein.

With reference to FIG. 6, in embodiments, the cathode plate 150 may comprise four cathodes 151 that are radially separated from adjacent cathodes 151 of the four cathodes 151 by 90°. In other embodiments, the cathode plate 150 may comprise three cathodes 151, five cathodes 151, six cathodes 151, or even more than six cathodes 151. In the embodiment depicted in FIG. 6, the cathode plate 150 comprises a first cathode 251*a*, a second cathode 251*b*, a third cathode 251*c*, and a fourth cathode 251*d*. The first cathode 251*a* and the third cathode 251*c* may be radially opposite with respect to the aperture axis A of the cathode plate 150 and define a first cathode axis CA-1. The second cathode 251*b* and the fourth cathode 251*d* may be radially opposite with respect to the aperture axis A of the cathode plate 150 and define a second cathode axis CA-2 substantially perpendicular to the first cathode axis CA-1. In the embodiment of the cathode plate 150 shown in FIG. 6, the cathode plate comprises a first cooling channel 262, a second cooling channel 264, a third cooling channel 266, and a fourth cooling channel 268, wherein each of the first cooling channel 262, the second cooling channel 264, the third cooling channel 266, and the fourth cooling channel 268 run through a thickness t of the cathode plate 150. Moreover, while the embodiment shown in FIG. 6 includes four cathodes, the cathodes of embodiments including more or fewer than four cathodes may similarly be positioned between a pair of cooling channels which connect with cooling channels of the adjacent cathodes.

The first cooling channel 262 may enter the cathode plate 150 proximate the first cathode 251*a*, extend toward the cathode plate aperture 153 in a first direction DIR-1 (i.e., in the +x direction) parallel to the first cathode axis CA-1, turn in a second direction DIR-2 (i.e., in the +y direction) parallel to the second cathode axis CA-2, and exit the cathode plate 150 proximate the second cathode 251*b*. The second cooling channel 264 may enter the cathode plate 150 proximate the second cathode 251*b*, extend toward the cathode plate aperture 153 in a third direction DIR-3 (i.e., in the −y direction) opposite the second direction DIR-2, turn in the first direction DIR-1, and exit the cathode plate 150 proximate the third cathode 251*c*. The third cooling channel 266 may enter the cathode plate 150 proximate the third cathode 251*c*, extend toward the cathode plate aperture 153 in a fourth direction DIR-4 (i.e., in the −x direction) opposite the first direction DIR-1, turn in the third direction DIR-3, and exit the cathode plate 150 proximate the fourth cathode 251*d*. The fourth cooling channel 268 may enter the cathode plate 150 proximate the fourth cathode 251*d*, extend toward the cathode plate aperture 153 in the second direction DIR-2, turn in the fourth direction DIR-4, and exit the cathode plate 150 proximate the first cathode 251*a*.

Cooling fluid may flow through the first cooling channel 262 by entering the first cooling channel 262 proximate the first cathode 251*a* and exiting the first cooling channel 262 proximate the second cathode 251*b*, or vice versa. Cooling fluid may flow through the second cooling channel 264 by entering the second cooling channel 264 proximate the second cathode 251*b* and exiting the second cooling channel 264 proximate the third cathode 251*c*, or vice versa. Cooling fluid may flow through the third cooling channel 266 by entering the third cooling channel 266 proximate the third cathode 251*c* and exiting the third cooling channel 266 proximate the fourth cathode 251*d*, or vice versa. Cooling fluid may flow through the fourth cooling channel 268 by entering the fourth cooling channel 268 proximate the fourth cathode 251*d* and exiting the fourth cooling channel 268 proximate the first cathode 251*a*, or vice versa. Moreover, as discussed above with respect to the embodiment shown in FIGS. 4A and 4B, the cooling channels of the cathode plate 150 shown in FIG. 6 may be spaced from the each of the first cathode axis CA-1 and the second cathode axis CA-2 by separation distance $L_C$ equal to at least 0.5 times the diameter of the cooling channels, at least 1.0 times the diameter of the cooling channels, at least 1.5 times the diameter of the cooling channels, or at least 2.0 times the diameter of the cooling channels. However, as discussed above, the cooling channels may be placed as close as possible to the cathodes while maintaining a sufficient buffer to maintain vacuum integrity in case of material erosion or melting.

It should be understood that the cooling channel arrangement schematically depicted in FIG. 6 may be, in embodiments, implemented in the cathode plate 150 depicted in FIGS. 4A and 4B (i.e., as shown in FIG. 6 but without the second cathode 251*b* and the fourth cathode 251*d*. Moreover, it should be understood that while the embodiment of the cathode plate 150 schematically depicted in FIG. 6 shows each of the first cathode 251*a*, the second cathode 251*b*, the third cathode 251*c*, and the fourth cathode 251*d* with portions extending through the edge 156 of the cathode plate 150, e.g., as may be the case when the cathodes are electrically isolated from the remainder of the cathode plate 150, in embodiments, the first cathode 251*a*, the second cathode 251*b*, the third cathode 251*c*, and the fourth cathode 251*d* may be embedded in the cathode plate 150 without a portion of the cathodes extending through the edge 156, e.g., as may be the case when the cathodes are not electrically isolated from the remainder of the cathode plate 150.

Figure 7A:
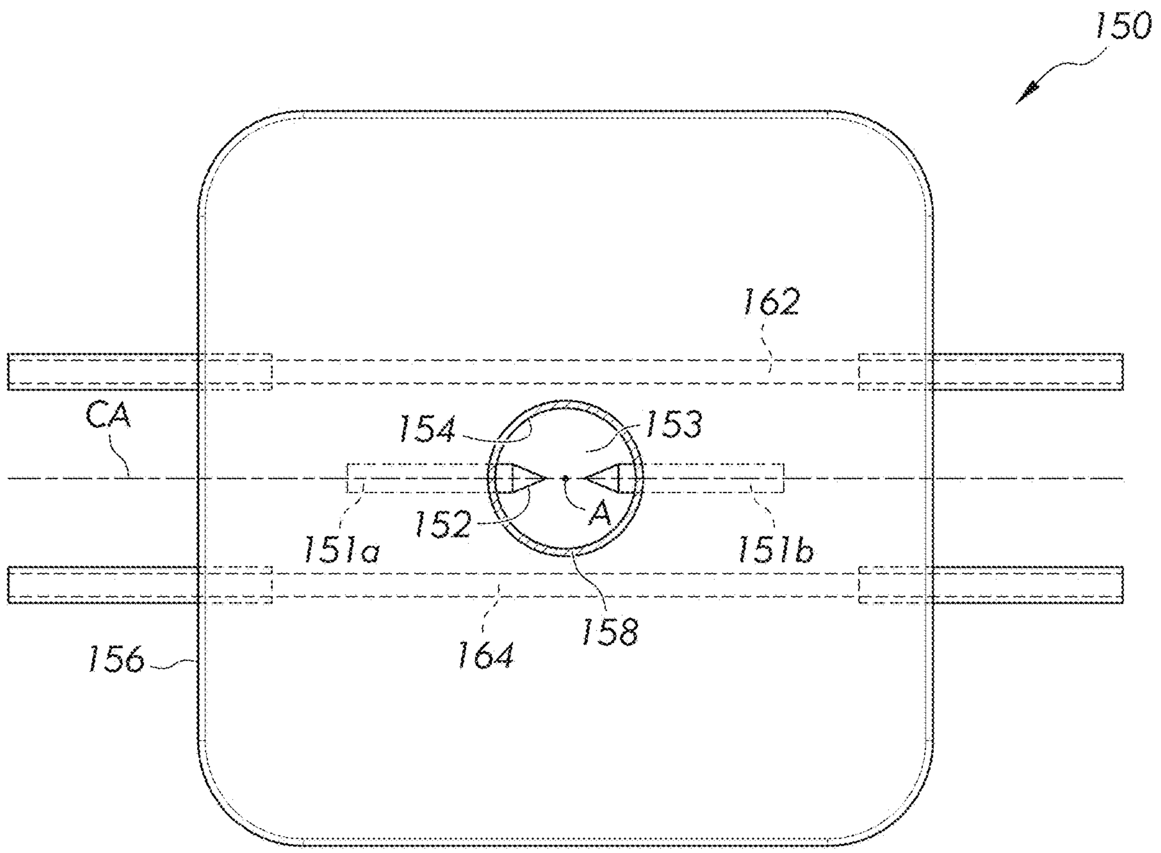
FIG. 7A schematically depicts a front view of a cathode plate wherein a ring of refractory metal forms the inner wall of the cathode plate aperture, according to embodiments disclosed and described herein.
Figure 7B:
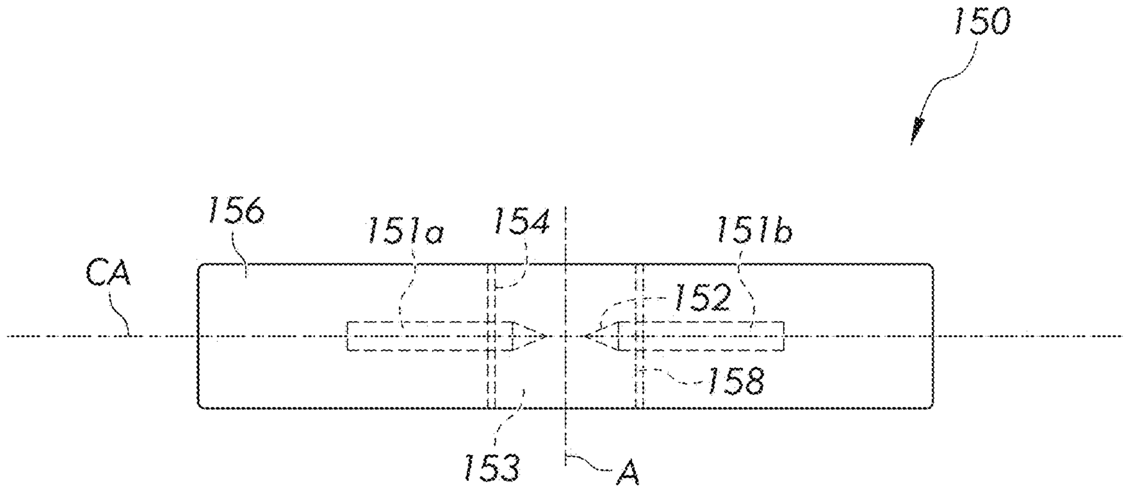
FIG. 7B schematically depicts a side view of the cathode plate shown in FIG. 7A.

With reference now to FIGS. 7A and 7B (cooling channels not shown in FIG. 7B), in embodiments of the cathode plate 150, the cathode aperture wall 154 may be formed from a refractory metal. In particular, a ring of refractory metal 158, such as tungsten or molybdenum, may be used to form the cathode aperture wall 154 of the cathode plate aperture 153, and thereby a portion of the inner wall of the plasma channel 141. In such embodiments, a thermally conductive metal plate may be integrally formed around a cylindrical slug of the refractory metal, such as by molding liquidus thermally conductive metal around the cylindrical slug of refractory metal. Once the thermally conductive metal plate is formed, the cylindrical slug may be machined to form the cathode plate 150 having the cathode aperture wall 154 formed with the ring of refractory metal 158, as shown in FIGS. 7A and 7B. The ring of refractory metal 158 may improve the durability of the cathode aperture wall 154 as thermally conductive metals used to form the remainder of the cathode plate 150, such as copper, may not be able to withstand the temperatures caused by contact with—or even close proximity to—the plasma 105.

Figure 8:
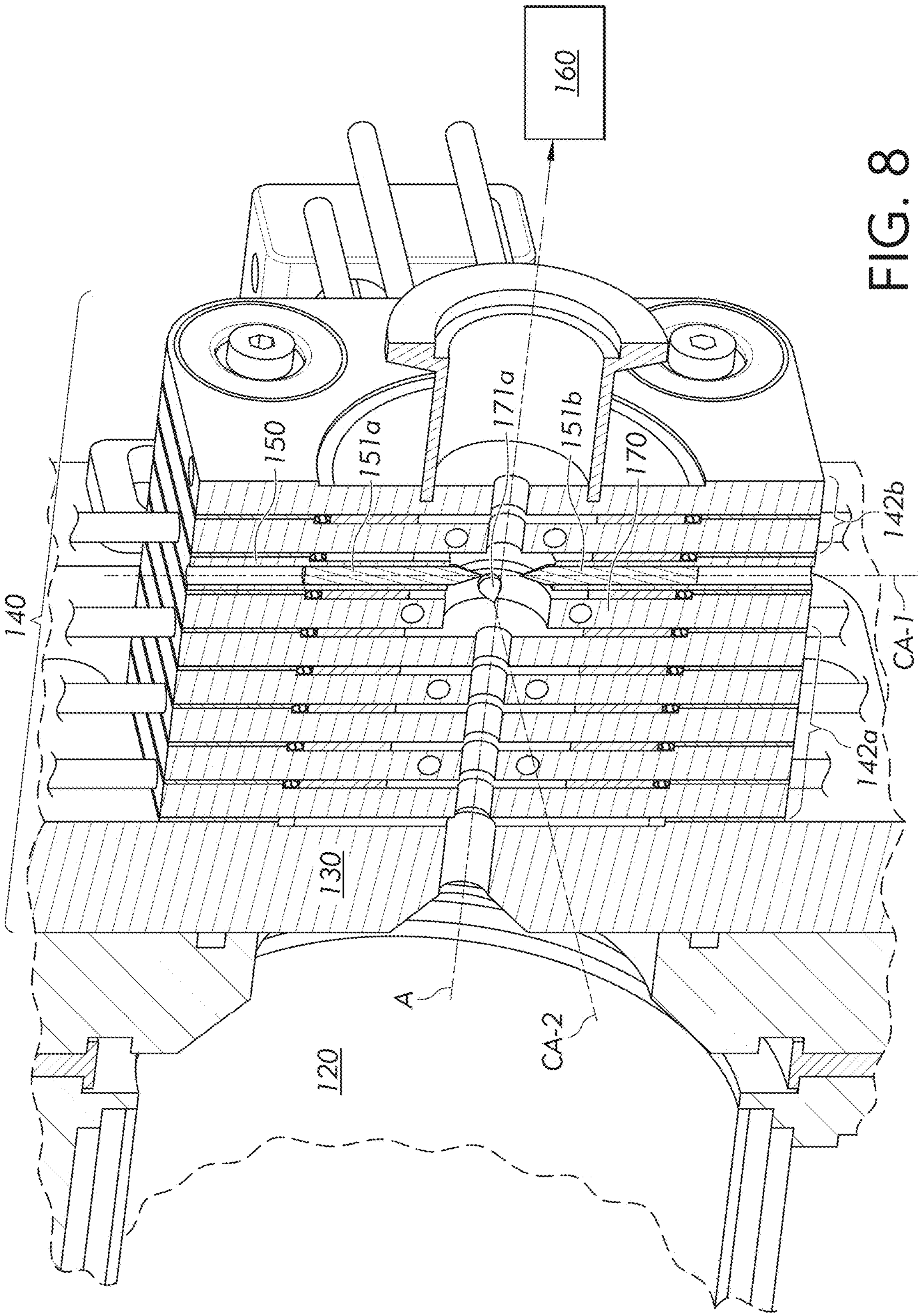
FIG. 8 schematically depicts a plasma window assembly including a plurality of cathode plates, according to embodiments disclosed and described herein.

With reference now to FIG. 8, in embodiments, the plurality of cooling plates 142 the plasma window assembly 140 may comprise a first plurality of cooling plates 142*a* and a second plurality of cooling plates 142*b*, wherein the cathode plate 150 is interposed between the first plurality of cooling plates 142*a* and the second plurality of cooling plates 142*b*. Without wishing to be bound by theory, it is believed that by positioning that cathode plate 150 between the first plurality of cooling plates 142*a* and the second plurality of cooling plates 142*b*, better heat management can be achieved for the plasma window assembly. In existing plasma window assemblies, such as that depicted in FIG. 3, some of the heat generated by the cathodes 51 to heat gas and create the plasma is spent heating components of the cathode housing 50 and target chamber 60, effectively wasting that energy. When at least one central cooling plate is configured to be the cathode plate 150, as shown in FIG. 8, a larger portion of the heat generated by the cathodes may be used to heat gas and create the plasma 105 as opposed to heating structural components of the plasma window assembly proximate the target chamber 160.

Additionally, the cooling plates on the high-pressure side of the cathode plate, e.g., more proximate to the target chamber, may self-bias and have electron suppression functionality without the need of an additional power supply. As such, the cooling plates on the high-pressure side of the cathode plate may avoid the need for electron suppression meshes or girds adjacent to the target chamber 160. However, in embodiments, an external power supply can apply a voltage to one or more of cooling plates 142*b* between cathode plate 150 and target chamber 160 (voltage negative with respect to the cathode voltage) to prevent unwanted electrons being driven into electrically grounded target chamber 160. Moreover, an electron suppression ring may be coupled to the cooling plate 142 most proximate to the target chamber to further suppress electron movement towards the target chamber 160.

The first plurality of cooling plates 142*a* may be adjacent and fluidly connected to the low-pressure chamber 120 of the beamline 102. The second plurality of cooling plates 142*b* may be adjacent and fluidly connected to the target chamber 160. Moreover, in addition to the cathode plate 150, embodiments of the plasma window assembly 140 may further comprise a second cathode plate 170, a third cathode plate (not shown), a fourth cathode plate (not shown), or even more than four cathode plates. The second, third, and fourth cathode plates may have any of the characteristics discussed above for the cathode plate 150, individually or in combination. As shown for the plasma window assembly 140 shown in FIG. 8, the second cathode plate 170 may be positioned adjacent to the cathode plate 150. Alternatively, the second cathode plate 170 may be spaced from the cathode plate 150 by one or more cooling plates 142.

In embodiments, the cathode plate 150 may comprise a first cathode 151*a* and a second cathode 151*b*, wherein the first cathode 151*a* is positioned radially opposite the second cathode 151*b* with respect to the aperture axis A of the cathode plate 150. The first cathode 151*a* and the second cathode 151*b* in FIG. 8 may define a first cathode axis CA-1. The second cathode plate 170 may comprise a first cathode 171*a* and a second cathode 171*b* (not shown), wherein the first cathode 171*a* is positioned radially opposite the second cathode 171*b* with respect to the aperture axis A of the second cathode plate 170, which as discussed above, may be aligned with the aperture axes A of the cathode plate 150 and the remaining cooling plates 142 to form the plasma channel 141. The first cathode 171*a* and the second cathode 171*b* of the second cathode plate 170 in FIG. 8 may define a second cathode axis CA-2. In embodiments, the second cathode axis CA-2 may be perpendicular to the first cathode axis CA-1. In this and other embodiments comprising multiple cathode plates, the characteristics of the plasma 105 generated in the plasma channel 141 may be adjusted to improve the performance and efficiency of the plasma window assembly 140. Indeed the stacking of multiple cathode plates may increase the number of emission points and thereby the maximum current of the discharge arc in the plasma channel 141.

Figure 9:
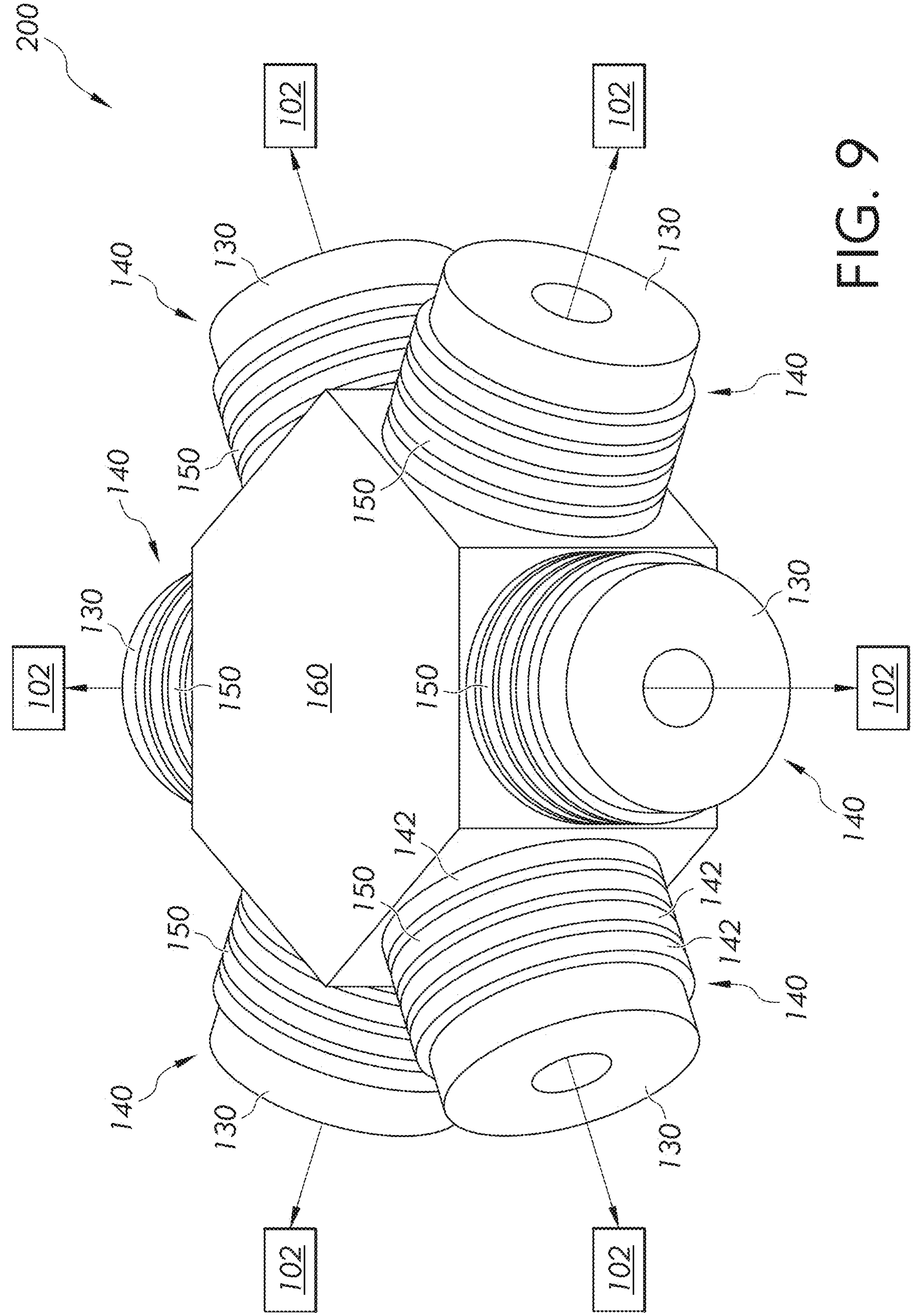
FIG. 9 schematically depicts a beam accelerator system having multiple beamlines arranged in a radial array, according to embodiments disclosed and described herein.

With reference now to FIG. 9, an embodiment of a multi-beamline embodiment of a beam accelerator system 200 is now described. Multi-beamline beam accelerator systems of the present disclosure may incorporate any of the concepts disclosed herein for each individual beamline. The beam accelerator system 200 may comprise a plurality of beamlines 102 each comprising a low-pressure chamber (see FIG. 1) and an ion accelerator (see FIG. 1) configured to generate an ion beam (see FIG. 1). The beam accelerator system 200 may further comprise a target chamber 160 coupled to each of the plurality of beamlines 102 such that the plurality of beamlines 102 direct the ion beams into the target chamber 160. The beam accelerator system 200 may further comprise a plurality of plasma window assemblies 140, each plasma window assembly 140 interposed between and fluidly connecting a respective beamline 102 of the plurality of beamlines 102 and the target chamber 160. As in the single-beamline beam accelerator systems discussed above with reference to FIGS. 1 and 2, each plasma window assembly 140 of the beam accelerator system 200 may comprise an anode 130 and a plurality of cooling plates 142 (only labeled in FIG. 9 for the bottom left plasma window assembly 140). Moreover, as described above for the single-beamline beam accelerator systems, each cooling plate 142 of the plasma window 140 of the beam accelerator system 200 may comprise an aperture (not visible in FIG. 9) having an aperture axis (not visible in FIG. 9) that is aligned with an aperture axis of an aperture in one or more adjacent cooling plates to form a plasma channel. Finally, as described above for the single-beamline beam accelerator systems, one or more cooling plates 142 of the plurality of cooling plates 142 of the plasma window assemblies 140 in the beam accelerator system 200 is a cathode plate 150 comprising at least one cathode 151 (not visible in FIG. 9). Additional features capable of incorporation into the multi-beamline beam accelerator systems of the present disclosure can be found in Patent Cooperation Treaty Application No. PCT/US23/34963, entitled “Multi-Beam Systems with Plasma Windows and a Central Target Chamber,” the entire contents of which are incorporated herein by reference.

Without wishing to be bound by theory, it is believed that the smaller physical size of the plasma window assemblies of the present disclosure may be important for high neutron flux applications (especially those involving multiple beamlines) due to increases in the volume available to the irradiation cavity. Moreover, some of the benefits of the reduced form factor plasma window assemblies of the present disclosure become clear in view of the beam accelerator system 200 shown in FIG. 9. Inherent space limitations associated with multi-beamline beam accelerator systems, wherein each beamline directs an ion beam to a centralized target chamber, do not permit bulky cathode arrangements adjacent to the target region. As such, the reduced design constraints associated with the plasma window assemblies of the present disclosure may enable more complex and higher performance beam accelerator systems. Moreover, the modular nature of the cathode plates of the present disclosure allow the cathode plate to positioned at any point within the one or more cooling plates of the plasma window assembly. This feature, potentially in combination with plate-to-plate variations of aperture diameter, allows for tuning of electrical characteristics of the arc discharge between the cathodes and the anode, and also allow for tuning of the pressure profile of the gas flow.

Additionally, the incorporation of the cathodes of the plasma window within the stack of cooling plates rather than adjacent to the target region may beneficially free up space adjacent to the target region. For instance, in neutron generation systems, the peak neutron production volume can be directly adjacent to the plasma channel of the plasma window. As such, the absence of a cathode arrangement in this region, as shown in FIG. 3, may results in a significant increase in neutron flux.

Figure 10:
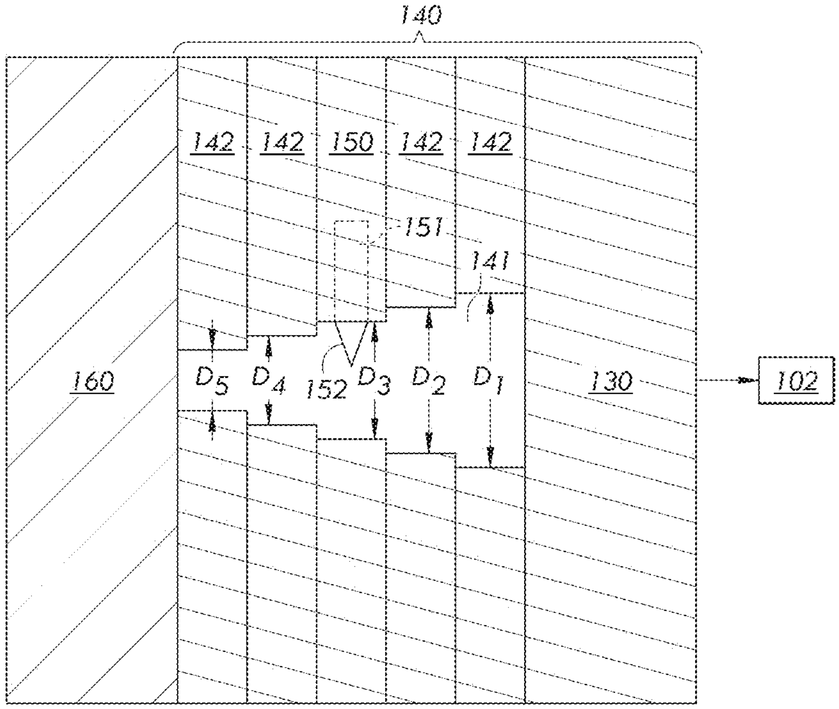
FIG. 10 schematically depicts a plasma window assembly wherein the cooling plates form a plasma channel that converges towards the target chamber, according to embodiments disclosed and described herein.
Figure 11:
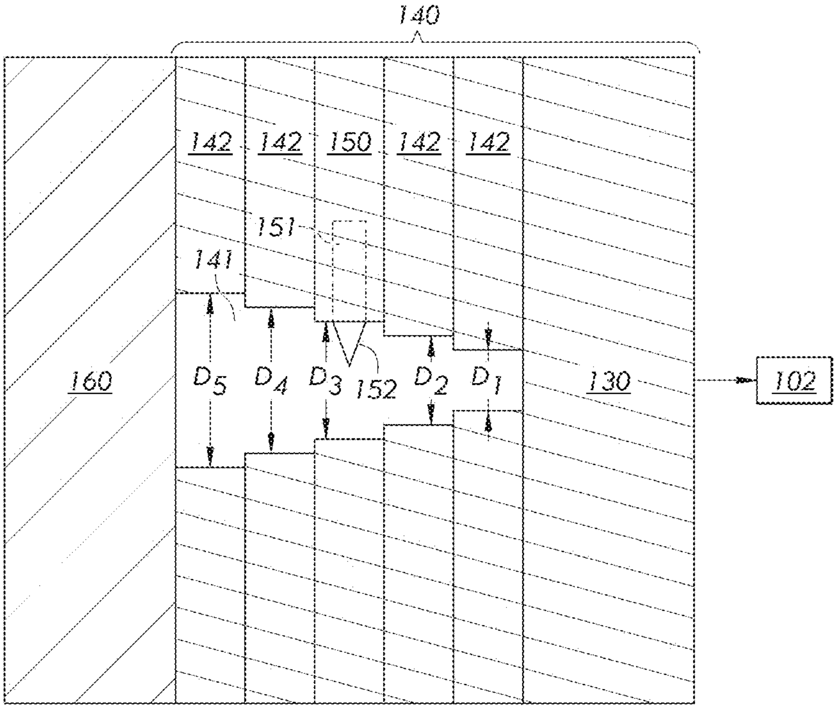
FIG. 11 schematically depicts a plasma window assembly wherein the cooling plates form a plasma channel that diverges towards the target chamber, according to embodiments disclosed and described herein.
Figure 12:
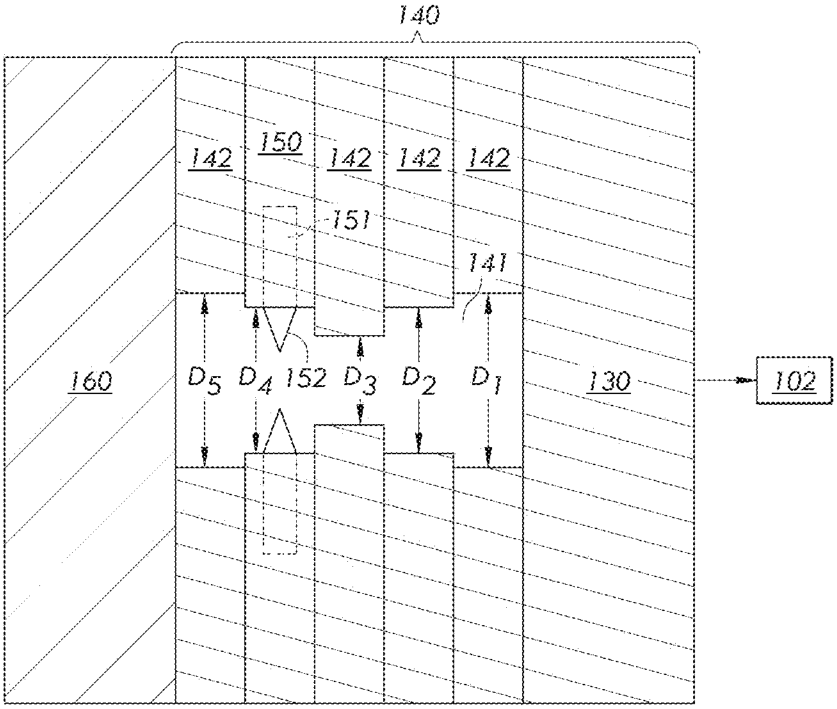
FIG. 12 schematically depicts a plasma window assembly wherein the cooling plates form a plasma channel having a nozzle shape, according to embodiments disclosed and described herein.

With reference now to FIGS. 10-12, embodiments of the plasma window assembly 140 are discussed wherein the cooling plates, including the cathode plate, have variable aperture diameters. Referring now to FIG. 10, the cooling plates 142 may be provided with a converging configuration wherein the diameters of the apertures become progressively smaller going from the anode 130 side of the plasma window assembly 140 to the target chamber 160 side of the plasma window assembly 140. The plasma window assembly 140 shown in FIG. 10 includes five cooling plates 142 with the center cooling plate being the cathode plate 150. As can be seen, the aperture diameters $D_1$, $D_2$, $D_3$, $D_4$, and $D_5$ of the cooling plates 142 decrease going from the anode 130 (right side of FIG. 10) to the target chamber 160 (left side of FIG. 10).

Referring now to FIG. 11, the cooling plates 142 may be provided with a diverging configuration wherein the diameters of the apertures become progressively larger going from the anode 130 side of the plasma window assembly 140 to the target chamber 160 side of the plasma window assembly 140. The plasma window assembly 140 shown in FIG. 11 includes five cooling plates 142 with the center cooling plate being the cathode plate 150. As can be seen, the aperture diameters $D_1$, $D_2$, $D_3$, $D_4$, and $D_5$ of the cooling plates 142 increase going from the anode 130 (right side of FIG. 11) to the target chamber 160 (left side of FIG. 11).

Referring now to FIG. 12, the cooling plates 142 may be provided with a nozzle configuration wherein the diameters of the apertures become progressively smaller going from the anode 130 side of the plasma window assembly 140 to the central region of the plasma window assembly 140 and then get progressively larger approaching the target chamber 160 side of the plasma window assembly 140. The plasma window assembly 140 shown in FIG. 12 includes five cooling plates 142 with the cooling plate second from the target chamber 160 being the cathode plate 150. As can be seen, the aperture diameters $D_1$, $D_2$, $D_3$, $D_4$, and $D_5$ of the cooling plates 142 decrease going from the anode 130 (right side of FIG. 10) to the central region of the plasma window assembly 140 and then get progressively larger approaching the target chamber 160 (left side of FIG. 12).

While the embodiments shown in FIGS. 10-12 include the cathode plate 150 as the center cooling plate, the cathode plate 150 may be implemented as any of the cooling plates 142. Moreover, while the embodiment shown in FIG. 10 includes a single cathode plate 150, it is contemplated that multiple cathode plates 150 may be implemented in plasma window assemblies having variable aperture diameters. The combination of multiple cathode plates with variable plate-to-plate aperture diameter may increase the maximum current of the discharge arc in the plasma channel 141 while, allow for the tuning of electrical characteristics of the arc discharge between the cathodes and the anode, and allow for tuning of the pressure profile of the gas flow.

According to a first aspect of the present disclosure, a beam accelerator system comprises a beamline comprising a low-pressure chamber and an ion accelerator configured to generate an ion beam; a target chamber; and a plasma window assembly interposed between and fluidly connecting the beamline and the target chamber. The plasma window assembly comprises an anode and a plurality of cooling plates, each cooling plate comprising an aperture having an aperture axis that is aligned with an aperture axis of an aperture in one or more adjacent cooling plates to form a plasma channel, wherein one or more cooling plates of the plurality of cooling plates is a cathode plate comprising at least one cathode.

A second aspect includes the first aspect, wherein the at least one cathode comprises a plurality of cathodes radially arranged about the aperture axis of the cathode plate.

A third aspect includes the second aspect, wherein the at least one cathode comprises a first cathode and a second cathode, the first cathode positioned radially opposite the second cathode with respect to the aperture axis of the cathode plate.

A fourth aspect includes the third aspect, wherein the first cathode and the second cathode define a cathode axis, and wherein the cathode plate further comprises one or more cooling channels extending through the cathode plate in a direction substantially parallel to the cathode axis.

A fifth aspect includes the second aspect, wherein the at least one cathode comprises four cathodes that are radially separated from adjacent cathodes of the four cathodes by 90°.

A sixth aspect includes the fifth aspect, wherein the four cathodes comprise a first cathode, a second cathode, a third cathode, and a fourth cathode, wherein the first cathode and the third cathode are radially opposite and define a first cathode axis, and wherein the second cathode and the fourth cathode are radially opposite and define a second cathode axis substantially perpendicular to the first cathode axis. The cathode plate further comprises a first cooling channel, a second cooling channel, a third cooling channel, and a fourth cooling channel that run through a thickness of the cathode plate, wherein: the first cooling channel enters the cathode plate proximate the first cathode, extends toward the aperture in a first direction parallel to the first cathode axis, turns in a second direction parallel to the second cathode axis, and exits the cathode plate proximate the second cathode; the second cooling channel enters the cathode plate proximate the second cathode, extends toward the aperture in a third direction opposite the second direction, turns in the first direction, and exits the cathode plate proximate the third cathode; the third cooling channel enters the cathode plate proximate the third cathode, extends toward the aperture in a fourth direction opposite the first direction, turns in the third direction, and exits the cathode plate proximate the fourth cathode; and the fourth cooling channel enters the cathode plate proximate the fourth cathode, extends toward the aperture in the second direction, turns in the fourth direction, and exits the cathode plate proximate the first cathode.

A seventh aspect includes any one of the first through sixth aspects, wherein each cathode of the at least one cathode comprises a cathode tip that protrudes radially inwards from an inner wall of the aperture of the cathode plate.

An eighth aspect includes the seventh aspect, wherein the cathode tip protrudes radially inwards to a distance from the inner wall that is less than or equal to 0.25 times $D_{CP}$, where $D_{CP}$ is a diameter of the aperture.

A ninth aspect includes any one of the first through eighth aspects, wherein each cathode of the at least one cathode is electrically isolated from a remainder of the cathode plate.

A tenth aspect includes any one of the first through eighth aspects, wherein each cathode of the at least one cathode is not electrically isolated from a remainder of the cathode plate.

An eleventh aspect includes any one of the first through tenth aspects, wherein an inner wall of the aperture of the cathode plate is formed from a refractory metal.

A twelfth aspect includes any one of the first through eleventh aspects, wherein the plurality of cooling plates comprises a first plurality of cooling plates and a second plurality of cooling plates, and wherein the cathode plate is interposed between the first plurality of cooling plates and the second plurality of cooling plates.

A thirteenth aspect includes any one of the first through twelfth aspects, wherein the plurality of cooling plates comprises a second cathode plate comprising at least one cathode.

A fourteenth aspect includes the thirteenth aspect, wherein the second cathode plate is adjacent to the cathode plate, and wherein: the at least one cathode of the cathode plate comprises a first cathode and a second cathode, wherein the first cathode is positioned radially opposite the second cathode with respect to the aperture axis of the cathode plate, and wherein the first cathode and the second cathode define a first cathode axis; the at least one cathode of the second cathode plate comprises a third cathode and a fourth cathode, wherein the third cathode is positioned radially opposite the fourth cathode with respect to the aperture axis of the second cathode plate, and wherein the third cathode and the fourth cathode define a second cathode axis, and wherein the second cathode axis is perpendicular to the first cathode axis.

According to a fifteenth aspect of the present disclosure, a beam accelerator system comprises a plurality of beamlines each comprising a low-pressure chamber and an ion accelerator configured to generate an ion beam; a target chamber coupled to each of the plurality of beamlines such that the plurality of beamlines direct the ion beams into the target chamber; and a plurality of plasma window assemblies, each plasma window assembly interposed between and fluidly connecting a respective beamline of the plurality of beamlines and the target chamber. Each plasma window assembly comprises an anode and a plurality of cooling plates, each cooling plate comprising an aperture having an aperture axis that is aligned with an aperture axis of an aperture in one or more adjacent cooling plates to form a plasma channel, wherein one or more cooling plates of the plurality of cooling plates is a cathode plate comprising at least one cathode.

A sixteenth aspect includes the fifteenth aspect, wherein the at least one cathode comprises a plurality of cathodes radially arranged about the aperture axis of the cathode plate.

According to a seventeenth aspect of the present disclosure, a method comprises generating a plasma in a plasma channel of a plasma window assembly interposed between and fluidly connecting a beamline and a target chamber, wherein the beamline comprises a low pressure chamber and an ion accelerator that generates an ion beam; and directing the ion beam through the plasma and into the target chamber. The plasma window assembly comprises an anode and a plurality of cooling plates, each cooling plate comprising an aperture having an aperture axis that is aligned with an aperture axis of an aperture in one or more adjacent cooling plates to form the plasma channel. One or more cooling plates of the plurality of cooling plates is a cathode plate comprising at least one cathode.

An eighteenth aspect includes the seventeenth aspect, wherein generating the plasma in the plasma channel comprises applying an input voltage to a target gas in the plasma channel, thereby heating and ionizing a portion of the target gas to form the plasma.

A nineteenth aspect includes any one of the seventeenth or eighteenth aspects, wherein the target chamber houses a target gas and the ion beam interacts with the target gas to produce neutrons via a fusion reaction.

A twentieth aspect includes any one of the seventeenth through nineteenth aspects, further comprising impinging a sample volume with neutrons generated via the fusion reaction.

While particular embodiments have been illustrated and described herein, it should be understood that various other changes and modifications might be made without departing from the spirit and scope of the claimed subject matter. Moreover, although various aspects of the claimed subject matter have been described herein, such aspects need not be utilized in combination. Thus, it is intended that the specification cover the modifications and variations of the various embodiments described herein provided such modification and variations come within the scope of the appended claims and their equivalents.

Although the figures and description may illustrate a specific order of method steps, the order of such steps may differ from what is depicted and described, unless specified differently above. Also, two or more steps may be performed concurrently or with partial concurrence, unless specified differently above. Such variation may depend, for example, on the software and hardware systems chosen and on designer choice. All such variations are within the scope of the disclosure. Likewise, software implementations of the described methods could be accomplished with standard programming techniques with rule-based logic and other logic to accomplish the various connection steps, processing steps, comparison steps, and decision steps.

What is claimed is:

1. A beam accelerator system comprising:
a beamline comprising a low-pressure chamber and an ion accelerator configured to generate an ion beam;
a target chamber; and
a plasma window assembly interposed between and fluidly connecting the beamline and the target chamber, wherein the plasma window assembly comprises:
an anode; and
a plurality of cooling plates, each cooling plate comprising an aperture having an aperture axis that is aligned with an aperture axis of an aperture in one or more adjacent cooling plates to form a plasma channel, wherein one or more cooling plates of the plurality of cooling plates is a cathode plate comprising at least one cathode, wherein
the plurality of cooling plates comprises a first plurality of cooling plates and a second plurality of cooling plates,
the cathode plate is interposed between the first plurality of cooling plates and the second plurality of cooling plates, and
the second plurality of cooling plates is positioned between the cathode plate and the target chamber.

2. The beam accelerator system of claim 1, wherein the at least one cathode comprises a plurality of cathodes radially arranged about the aperture axis of the cathode plate.

3. The beam accelerator system of claim 2, wherein the at least one cathode comprises a first cathode and a second cathode, the first cathode positioned radially opposite the second cathode with respect to the aperture axis of the cathode plate.

4. The beam accelerator system of claim 3, wherein the first cathode and the second cathode define a cathode axis, and wherein the cathode plate further comprises one or more cooling channels extending through the cathode plate in a direction substantially parallel to the cathode axis.

5. The beam accelerator system of claim 2, wherein the at least one cathode comprises four cathodes that are radially separated from adjacent cathodes of the four cathodes by 90°.

6. The beam accelerator system of claim 5, wherein:
the four cathodes comprise a first cathode, a second cathode, a third cathode, and a fourth cathode, wherein the first cathode and the third cathode are radially opposite and define a first cathode axis, and wherein the second cathode and the fourth cathode are radially opposite and define a second cathode axis substantially perpendicular to the first cathode axis; and
the cathode plate further comprises a first cooling channel, a second cooling channel, a third cooling channel, and a fourth cooling channel that run through a thickness of the cathode plate, wherein:
the first cooling channel enters the cathode plate proximate the first cathode, extends toward the aperture in a first direction parallel to the first cathode axis, turns in a second direction parallel to the second cathode axis, and exits the cathode plate proximate the second cathode;
the second cooling channel enters the cathode plate proximate the second cathode, extends toward the aperture in a third direction opposite the second direction, turns in the first direction, and exits the cathode plate proximate the third cathode;
the third cooling channel enters the cathode plate proximate the third cathode, extends toward the aperture in a fourth direction opposite the first direction, turns in the third direction, and exits the cathode plate proximate the fourth cathode; and
the fourth cooling channel enters the cathode plate proximate the fourth cathode, extends toward the aperture in the second direction, turns in the fourth direction, and exits the cathode plate proximate the first cathode.

7. The beam accelerator system of claim 1, wherein each cathode of the at least one cathode comprises a cathode tip that protrudes radially inwards from an inner wall of the aperture of the cathode plate.

8. The beam accelerator system of claim 7, wherein the cathode tip protrudes radially inwards to a distance from the inner wall that is less than or equal to 0.25 times $D_{CP}$, where $D_{CP}$ is a diameter of the aperture.

9. The beam accelerator system of claim 1, wherein each cathode of the at least one cathode is electrically isolated from a remainder of the cathode plate.

10. The beam accelerator system of claim 1, wherein each cathode of the at least one cathode is not electrically isolated from a remainder of the cathode plate.

11. The beam accelerator system of claim 1, wherein an inner wall of the aperture of the cathode plate is formed from a refractory metal.

12. The beam accelerator system of claim 1, wherein the plurality of cooling plates comprises a second cathode plate comprising at least one cathode.

13. The beam accelerator system of claim 12, wherein the second cathode plate is adjacent to the cathode plate, and wherein:
the at least one cathode of the cathode plate comprises a first cathode and a second cathode, wherein the first cathode is positioned radially opposite the second cathode with respect to the aperture axis of the cathode plate, and wherein the first cathode and the second cathode define a first cathode axis; and
the at least one cathode of the second cathode plate comprises a third cathode and a fourth cathode, wherein the third cathode is positioned radially opposite the fourth cathode with respect to the aperture axis of the second cathode plate, and wherein the third cathode and the fourth cathode define a second cathode axis, and wherein the second cathode axis is perpendicular to the first cathode axis.

* * * * *